United States Patent
Tate

(10) Patent No.: US 12,307,442 B2
(45) Date of Patent: May 20, 2025

(54) SYSTEMS, METHODS AND SCHEMA FOR CRYPTOGRAPHIC PROMISSORY FILES

(71) Applicant: Knox Networks, Inc., New York, NY (US)

(72) Inventor: Ryan Michael Tate, Tacoma, WA (US)

(73) Assignee: KNOX NETWORKS, INC., New York, NY (US)

(*) Notice: Subject to any disclaimer, the term of this patent is extended or adjusted under 35 U.S.C. 154(b) by 125 days.

(21) Appl. No.: 18/082,630

(22) Filed: Dec. 16, 2022

(65) Prior Publication Data
US 2023/0196347 A1 Jun. 22, 2023

Related U.S. Application Data

(60) Provisional application No. 63/290,133, filed on Dec. 16, 2021.

(51) Int. Cl.
G06Q 20/38 (2012.01)
G06Q 20/40 (2012.01)

(52) U.S. Cl.
CPC ..... *G06Q 20/3825* (2013.01); *G06Q 20/3827* (2013.01); *G06Q 20/401* (2013.01); *G06Q 2220/00* (2013.01)

(58) Field of Classification Search
CPC .......... G06Q 20/3825; G06Q 20/3827; G06Q 20/401; G06Q 2220/00; G06Q 20/10; G06Q 40/02; G06Q 20/065
See application file for complete search history.

(56) References Cited

U.S. PATENT DOCUMENTS

| | | | |
|---|---|---|---|
| 11,233,657 B2 * | 1/2022 | Almgren | H04L 9/50 |
| 12,099,997 B1 * | 9/2024 | Hoffberg | G06Q 20/065 |
| 2016/0212146 A1 * | 7/2016 | Wilson | H04L 9/3226 |
| 2020/0379856 A1 * | 12/2020 | Jayachandran | H04L 41/0654 |
| 2021/0065070 A1 * | 3/2021 | Augustine | H04L 9/0643 |
| 2021/0073913 A1 * | 3/2021 | Ingargiola | G06F 16/2358 |

FOREIGN PATENT DOCUMENTS

DE    102018200100 A1 *  7/2019 ............. G06F 21/64

OTHER PUBLICATIONS

"Applications of Cryptographic Hash Functions", Jared Nishikawa, 2010, Willamette University (Year: 2010).*

* cited by examiner

*Primary Examiner* — Duan Zhang
(74) *Attorney, Agent, or Firm* — FisherBroyles, LLP; John Boyd; James J. Pohl

(57) ABSTRACT

Systems, methods and schema for issuing, authorizing, sending, receiving, verifying and reporting cryptographic promissory files. Collectively, these systems, methods and schema enable implementation of a secure, concurrent and high-volume cryptographic digital money infrastructure for reserve and commercial monetary transactions.

19 Claims, 15 Drawing Sheets

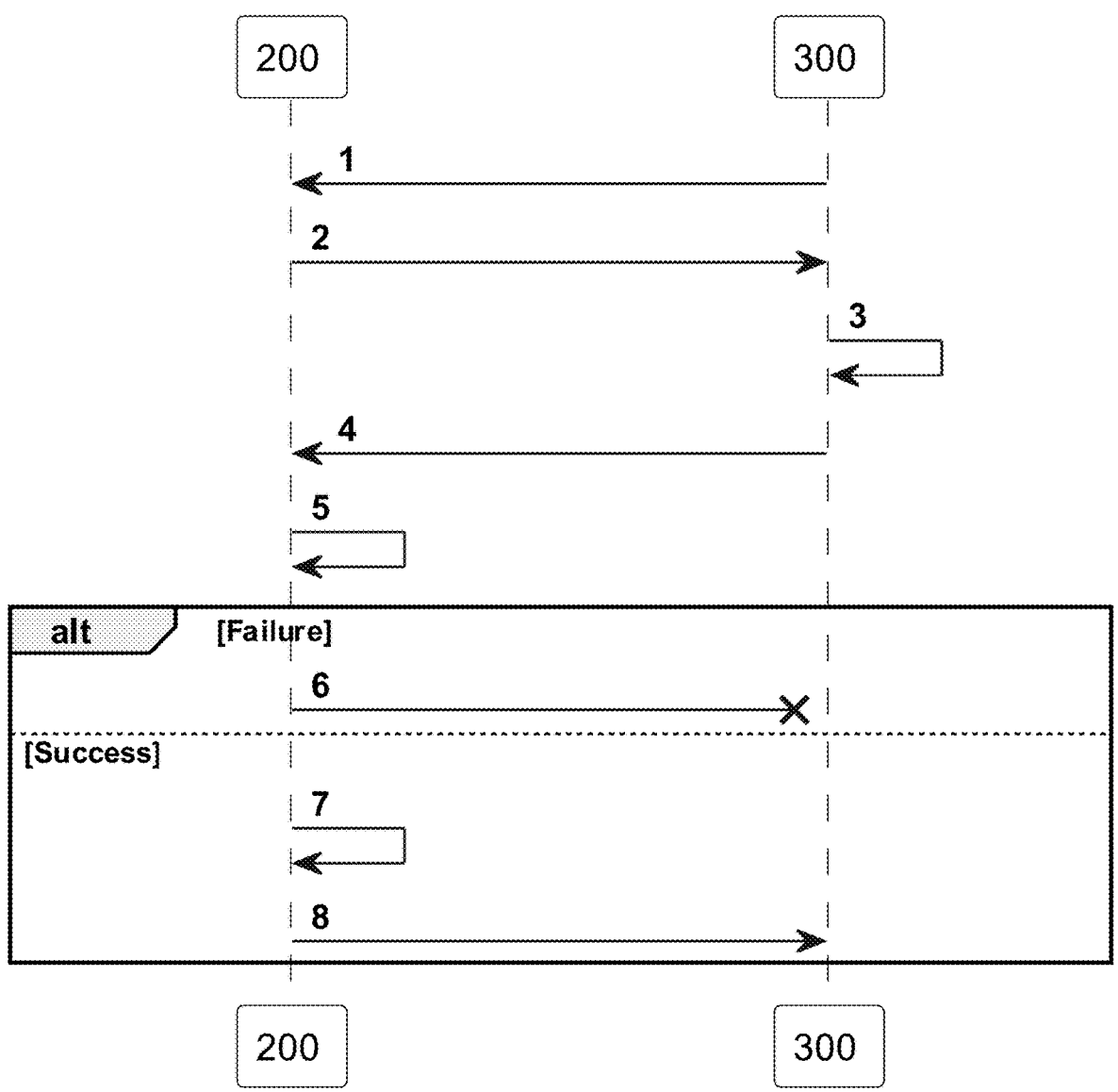

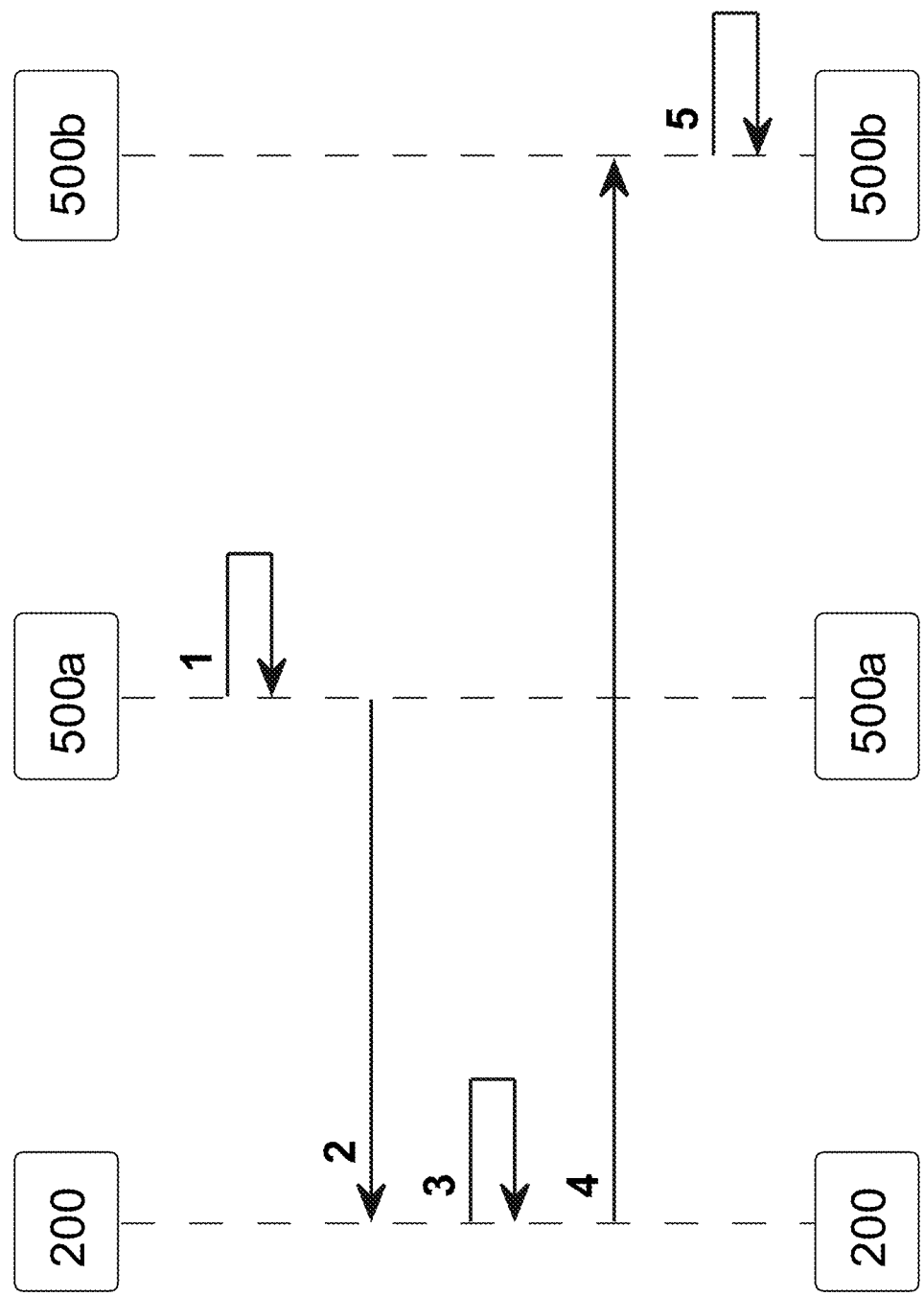

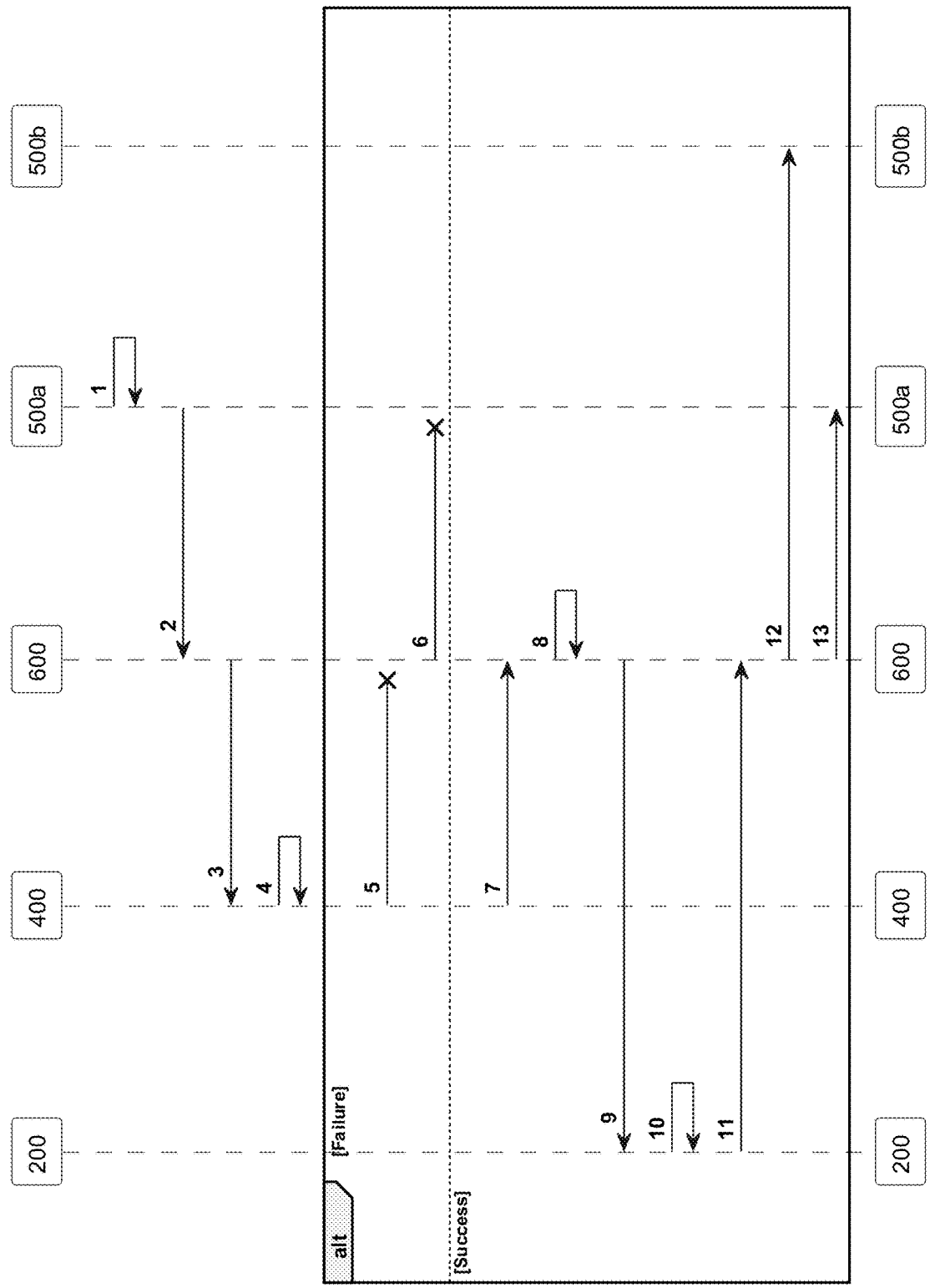

SYSTEMS, METHODS AND SCHEMA FOR CRYPTOGRAPHIC PROMISSORY FILES

REFERENCE TO RELATED APPLICATIONS

This application claims the benefit of U.S. Provisional Application Ser. No. 63/290,133, filed on Dec. 16, 2021, the entire content of which is incorporated herein by reference.

BACKGROUND OF THE INVENTION

Paper bearer instruments, such as banknotes, are transacted among independent entities, often in private settings without a central or shared account ledger maintaining a balance for each entity, allowing transactions between independent entities to be negotiated and settled concurrently, and directly between peers.

Centralized account-based systems introduce the need for a third party to decrement and increment the balance of accounts negotiating a settlement, while also enabling anti-fraud mechanisms for restricting transfers and preventing illicit activities, which in contrast paper bearer instruments do not inherently provide.

Accordingly, it may be understood that both systems offer benefits to economic networks; however, existing solutions fall short of providing the high-volume concurrency of fixed-value bearer instruments combined with the monitoring and capital controls provided in a federated account-based system.

The following disclosure of the invention introduces a scalable solution that demonstrates concurrent, high-volume transactions, while introducing asymmetric cryptographic guarantees against fraudulent activities that can be used to provide oversight and control in a reserve and commercial monetary system.

OBJECT AND SUMMARY OF THE INVENTION

Existing account-based payment systems face several challenges for enabling a concurrent, high-volume digital infrastructure for reserve and commercial monetary transactions.

Concurrency in an account-based system requires the database to be divided into logical shards. However, concurrency is not guaranteed among databases, since two operations may be performed in two different logical shards for a single transaction, and therefore both database shards must hold a mutually exclusive lock on the underlying data to perform the operation in sync.

In account-based systems, concurrency is only enabled for optimistic settlements where operations are between accounts in the same logical shard. To guarantee atomicity, consistency, isolation and durability (ACID) properties for account records, additional checks are introduced to manage state changes between accounts, hindering high-volume performance.

An account-based payment system must increment and decrement account entries in the system for multiple accounts when performing a transaction. Additionally, an account-based payment system must implement complex batch processing algorithms for enabling concurrent, high-volume monetary transactions.

An account-based transaction batch processing algorithm requires determining existing account balance state in the logical database shards and determining whether the result of the batch process will result in insufficient funds for one or more accounts. Additionally, an account-based system must be able to apply or roll-back account balance state changes, which requires a mutually exclusive lock on the database shard(s), adding to performance bottlenecks in the processing of payment transactions.

In comparison, the invention disclosed logically shards the ownership record of monetary value on the cryptographic promissory file itself. Furthermore, the invention disclosed demonstrates authorized signing of promissory file(s) can be batched for verification and signing, which may be processed in parallel due the logical shard of value ownership being represented in the promissory file record itself. Batch processing of promissory file(s) for authorized signing requires that the promissory file is read from record and is cryptographically checked against the current and historical owners of the incoming promissory file. The record stored by the authority and delegated currency issuer is the promissory file itself, and the latest verified copy is updated and replicated in persistent storage.

By removing the need to calculate complex multi-account balance increments and decrements in the batch processing of payments, the disclosed invention enables the system to perform concurrent, high-volume monetary transactions that otherwise pose difficult, scalability challenges for account-based systems.

The invention disclosed enables performance scalability and fault tolerances through the ability for the monetary authority service or the delegated currency issuer service to provide an authorized cryptographic signature for a promissory file. In practice, this means that the process of cryptographically signing a transaction can be delegated to thousands of different service processes, reducing bottleneck performance issues in account-based systems or services with only one accepted cryptographic signer.

An account-based payment system must enable secure login to the remote account. As a result, logging into a financial institution account may encounter offline errors, inaccessibility, or denial of service (DoS) attacks. If an account-based system is unavailable, client account balances may be unavailable as well as the ability to move money.

In comparison, the invention disclosed provides the ability to transfer promissory file ownership directly between two participants, without requiring a third party or account-based system to perform the transfer. Cryptographically signing the promissory file is a local operation that does not require logging into a remote financial institution account to perform a transaction.

As monetary authorities explore new digital manifestations of money, it is critical that the systems implemented maintain a level of transactional oversight and control for ensuring the safety and validity of the economic network.

Paper bearer instruments, such as banknotes, offer concurrent, high-volume properties. However, banknotes are difficult to sanction due to their ability to be transacted in private settings, without the need for a third party to be involved.

In comparison, the invention disclosed introduces the ability for promissory file(s) to be transacted directly between participants in private settings, while maintaining the record of ownership on the promissory file itself, which is later processed by the monetary authority service or delegated currency issuer service.

Additionally, the invention disclosed discusses the purpose of the authorization signature to be used, in one embodiment, to restrict the transferring of promissory file(s), which is achieved simply by withholding an authorized signature. This feature may be used in cases where fraudulent or criminal activity is detected.

The invention disclosed provides anti-fraud mechanisms that are often features of an account-based systems, while maintaining peer-to-peer cash-like properties. In addition, the invention disclosed includes a timestamp in each of the signature blocks of a promissory file, enabling reporting systems to determine when a particular owner held the promissory file.

Collectively, these systems, methods and schema enable implementation of a secure, concurrent and high-volume cryptographic digital money infrastructure for reserve and commercial monetary transactions that are superior in transactional scalability compared to account-based systems.

FIELD OF THE INVENTION

This invention relates to digital monetary systems. To be more specific, this invention pertains to monetary methods and systems for fixed-value bearer instruments using asymmetric cryptography to record and transfer ownership.

BRIEF DESCRIPTION OF DRAWINGS

Embodiments are illustrated by way of example, and not by way of limitation, in the figures of the accompanying drawings and in which like reference numerals refer to similar elements.

FIG. 2A and FIG. 2B shows exemplary activity diagrams illustrating a monetary authority service and a delegated currency issuer service establishing currency issuance limits and registers its public key with the authority service in accordance with embodiments of the present invention.

FIG. 5 shows an exemplary sequence diagram illustrating systems for pre-authorizing of peer-to-peer transactions of promissory files in accordance with embodiments of the present invention.

FIG. 6A shows an exemplary sequence diagram illustrating systems for remitting promissory files in accordance with embodiments of the present invention.

BEST MODE FOR CARRYING OUT THE INVENTION

Figure 1A:
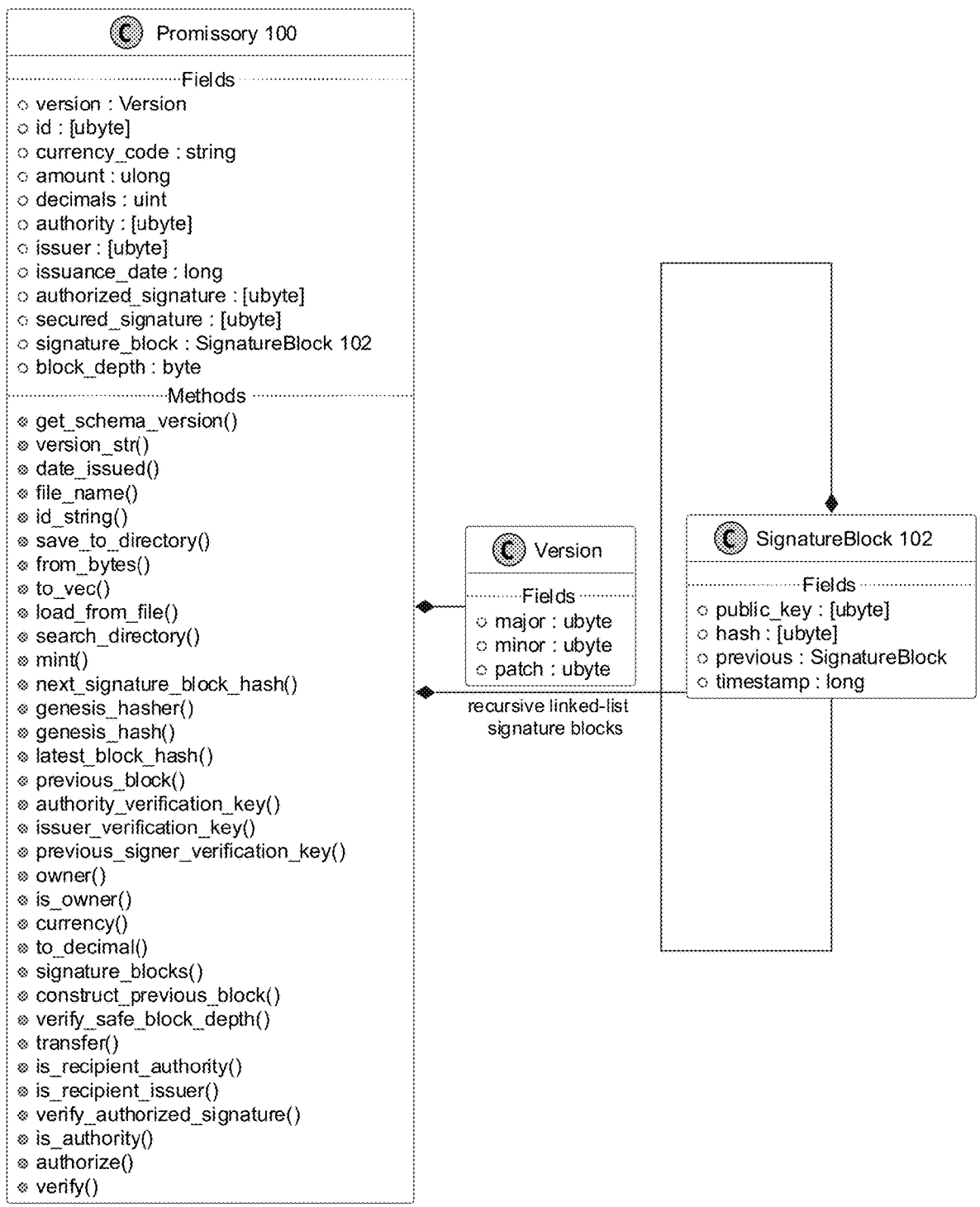
FIG. 1A shows an exemplary class diagram of the cryptographic promissory file instance in accordance with embodiments of the present invention.

The best mode of the disclosed invention involves use of an efficient and broadly supported serialization and deserialization format for cryptographic promissory files. An ideal format ensures cryptographic promissory files are implemented in a lightweight wire format for transmission over networking protocols, e.g., Transmission Control Protocol (TCP), User Datagram Protocol (UDP), etc. Embodiments of the invention may be implemented in various serialization formats that permit recursion.

The disclosed invention is network layer agnostic. Systems for processing cryptographic promissory files best communicate using a bi-directional, event-driven architecture. Cryptographic promissory files may be used in connection with other networking protocols to enable efficient relaying, routing and packet switching amongst connected peers.

The disclosed invention involves systems whose methods are best carried out as remote procedural calls (RPCs). Ideally, systems are implemented as "micro-services" to be modular, composable and scalable to make benefit the parallel and concurrent processing capabilities of cryptographic promissory files.

DESCRIPTION

Defined embodiments are discussed in detail with reference to the accompanying figures. Identical elements in the presented figures are denoted by like reference numerals for consistency. The following description of embodiments contain several defined details provided for improving the understanding of the invention. The provided descriptions of the embodiments shall be understood to not limit the disclosure of these embodiments. To the contrary, the disclosures are provided as to cover alternatives, modifications and equivalents, which are included in the essence and scope of the disclosure by the appended claims. It will be apparent to one of ordinary skill in the art that the invention may be practiced independent of the defined details. It will be understood that obvious features are not described to avoid unnecessarily complicating the description.

Systems, methods and schema for issuing, authorizing, sending, receiving, verifying and reporting cryptographic promissory files ("CPFs") are disclosed. In one embodiment, a cryptographic promissory file schema is disclosed. The cryptographic promissory file schema may compromise: a data structure for representing the semantic version number of the promissory file schema, a universally unique identifier for a promissory file, a ISO-4217 currency code, an amount, a decimal precision representation of the amount, an authority cryptographic public key, a delegated currency issuer cryptographic public key, an issuance date timestamp, an authorized signature of the most recent block hash signed by the authority or delegated currency issuer, a secured signature of the hash, signed by the previous signature block public key, a block depth representing the number of signature blocks linked in the signature block data structure, and a recursive linked-list hash chain signature block data structure with fields for the cryptographic public key representing the owner of the cryptographic promissory file at a given block depth, the unique hash representing the previous or root hash plus the cryptographic public key of the signature block, a linked-list of the previous signature block, and a timestamp representing when the signature block was created.

Those of ordinary skill in the art will appreciate that the promissory file can be instantiated in various file formats (e.g., flatbuffers, protocol buffers, JSON, XML, etc.), and files can be communicated over agnostic Open Systems Interconnection (OSI) transport, network and dataframe layers (e.g., Internet Protocol, NFC, Bluetooth, LoRa, NB-IoT, SigFox, etc.). Furthermore, those of ordinary skill in the art will acknowledge that additional fields may be added to the promissory file, which might include an interest rate and maturity date to represent a debt instrument that accrues interest, or a semantic version number to identify versions of the promissory file, or bit flag to denote the type of instrument the promissory file represents or a bit flag to denote the type of asymmetric cryptographic algorithms used for signing and verifying the promissory file.

The cryptographic promissory file schema, along with methods and procedures for verifying authenticity and ownership, enable systems, in one or more embodiments of the invention, to provide a secure, concurrent and high-volume cryptographic digital money infrastructure for reserve and commercial monetary transactions.

Embodiments of the invention relate to computer and mobile device systems which may include one or more of the following methods of the cryptographic promissory file schema, used individually or collectively with other methods listed: methods for issuing, authorizing, sending, receiving, verifying and reporting cryptographic promissory files.

In general, in one aspect, embodiments of the invention relate to a computer processing system for issuing cryptographic promissory files, which may include software instructions for: (i) providing an Internet Protocol (IP) network accessed application programming interface (API) for remote devices to request transferring of promissory files, (ii) requesting and maintaining issuance limits from a monetary authority service, (iii) constructing new promissory files, (iv) cryptographically signing promissory files, (v) requesting an authorized signature from a monetary authority service, (vi) recording issued promissory files in a persistent writable and readable storage, (vii) verifying promissory files, (viii) screening a sanctions list for denying transferring of promissory file ownership, (ix) requesting an encrypted know-your-customer (KYC) digital identity relationship associated with cryptographic public keys, and (x) maintaining a persistent writable and readable storage of promissory files.

In general, in one aspect, embodiments of the invention relate to a computer processing system for authorizing promissory files, which may include software instructions for: (i) providing an Internet Protocol (IP) network accessed application programming interface (API) for remote devices to request an authorized signature of promissory files, (ii) approving issuance limits to authorized delegated currency issuers, (iii) maintaining a record of ownership of promissory files in persistent writable and readable storage, (iv) maintaining issuance limits for delegated currency issuers in a persistent writable and readable storage, (v) verifying promissory files, (vi) identifying double spends or "forks" from the observability of duplicate owners of a promissory file at a specific block depth, (vii) reporting double spends or fraudulent activities to prosecuting authorities, (viii) screening a sanctions list for denying authorization of promissory file ownership, (ix) requesting an encrypted know-your-customer (KYC) digital identity relationship associated with cryptographic public keys, (x) maintaining a persistent writable and readable storage of promissory files, and (xi) destroying or archiving issued promissory files on behalf of a delegated currency issuer.

In general, in one aspect, embodiments of the invention relate to a computer processing system for exchanging foreign currency denominations of promissory files, which may include software instructions for: (i) providing an Internet Protocol (IP) network accessed application programming interface (API) for remote devices to request the foreign currency exchange of promissory files, (ii) maintaining an order book of promissory files to be exchanged for promissory files denominated in a foreign currency, (iii) receiving delegation of promissory files for the atomic transfer of promissory files, (iv) cryptographically signing promissory files for the transferring of ownership, (v) responding to request for quotes (RFQs) for currency pair exchange rates, (vi) reporting settlements of exchanged promissory files, (vii) remitting payments of foreign currency promissory files to a forwarding address represented by an Internet Protocol (IP) network address, email address or other Open Systems Interconnection (OSI) transport layer address, (viii) searching sanctions screening lists for sending and receiving parties involved in the exchange of promissory files, (ix) reporting incidents of sanctioned or fraudulent activities to monetary authorities, and (x) requesting an authorized signature from a monetary authority or delegated currency issuer for the new owner of the transferred promissory file.

In general, in one aspect, embodiments of the invention relate to a computer processing system for remitting promissory files, which may include software instructions for: (i) providing an Internet Protocol (IP) network accessed application programming interface (API) for remote devices to request the remittance of promissory files to a forwarding address represented by an Internet Protocol (IP) network address, email address or other Open Systems Interconnection (OSI) transport layer address, (ii) receiving delegation of promissory files for the atomic transfer of promissory files, (iii) cryptographically signing promissory files for the transferring of ownership to the remitted party, (iv) reporting settlements of exchanged promissory files, (v) searching sanctions screening lists for sending and receiving parties involved in the remittance of promissory files, (vi) reporting incidents of sanctioned or fraudulent activities to monetary authorities, and (vii) requesting an authorized signature from a monetary authority or delegated currency issuer for the new owner of the transferred promissory file.

In general, in one aspect, embodiments of the invention relate to a computer processing system for sanctions screening promissory files, which may include software instructions for: (i) compiling consolidated sanctions lists authored by monetary authorities and intergovernmental organizations (IGOs), (ii) comparing personal identifiable information (PII) against the compiled sanctions list, (iii) providing an Internet Protocol (IP) network accessed application programming interface (API) for remote devices to request the screening of promissory file ownership based on cryptographic public keys associated with personal identifiable information (PII) against the consolidated sanctions list, (iv) matching personal identifiable information (PII) against a consolidated sanctions list based on a matching algorithm, (v) maintaining an indexed record of cryptographic public keys associated with sanctioned entities, and (vi) reporting sanctioned entities associated with cryptographic public keys to monetary authorities.

In general, in one aspect, embodiments of the invention relate to a computer processing system for maintaining custodianship of promissory files, which may include software instructions for: (i) providing an Internet Protocol (IP) network accessed application programming interface (API) for remote devices to request the storage of promissory files on behalf of a cryptographic public key representing ownership of the promissory files, and (ii) retrieving promissory files held by the custodian service using proof of ownership based on cryptographic signature of request parameters and the public key for which the cryptographic signature matches.

In general, in one aspect, embodiments of the invention relate to a computer processing system for point-of-sale terminals transacting promissory files, which may include software instructions for: (i) maintaining a cryptographic key pair to sign and prove ownership of promissory files, (ii) providing a cryptographic public key identifier using a QR code or other means to request promissory files from a customer, (iii) calculating residual amounts owed back to customers when receiving an excess amount of promissory files, (iv) transferring promissory files that represent change back to the customer, and (v) exchanging promissory files for smaller denominations of promissory files with a treasury service or delegated currency issuer.

In one or more embodiments, the cryptographic promissory file is self-describing and directly verifiable based on the cryptographic signatures and linked-list block signature hash chain stored within. The structure and properties of the promissory file enable it to be read and written without a central, account-based service. One of ordinary skill in the art will appreciate the file can be stored on personal computer (PC), mobile devices and other embedded environments, such as NFC chips. Embodiments of the invention enable promissory files to be transferred to directly to another peer, without a third party or central service performing the transfer. Albeit the new owner of the promissory file must receive an authorized signature at a future time before being allowed to transfer the file to another peer. One of ordinary skill in the art will appreciate these properties enable promissory files to be transacted concurrently without connected dependencies and performance bottlenecks that arise in account-based systems.

In general, in one aspect, embodiments of the invention relate to a computer processing system for replicating known promissory files at a given block depth. Promissory files maintain a complete ownership record within the linked-list hash chain signature block of the file. The process of replication is to send a copy of the promissory file to another service that may write the promissory file in persistent storage, given a known block depth to compare against. For example, if the promissory file received by a service has a higher block depth, then the service replaces the current or known promissory file, if any, with the latest observed version. The monetary authority service will record all known promissory files that it has given an authorized signature for, but the delegated currency issuer may only maintain a record for the promissory files it has issued.

DETAILED DESCRIPTION OF THE DRAWINGS

FIG. 1A shows a class diagram of an instance of a cryptographic promissory file 100, including its fields and associative methods. In one or more embodiments, the promissory file 100 methods comprise: getter methods for returning stored values of the promissory file, methods for recursing the signature block linked-list hash chain 102 and calculating a block depth byte 104 according the number of signature blocks in the linked-list, a method for calculating the next signature block hash, a method for verifying 103 the correctness of the promissory file, a method for transferring ownership of the promissory file, a method for minting a new promissory file, methods for serializing and deserializing the promissory file to and from a byte array, methods for reading a promissory file from a local or remote directory, methods for saving a file to a local or remote directory, methods for searching for promissory files located in a local or remote directory. One of ordinary skill in the art may notice additional fields and methods may be implemented for the promissory file. The cryptographic promissory file is reference number 100 in the figures and descriptions. Methods and properties of cryptographic promissory files 100 are referenced in the 1XX series numbers in figures and descriptions.

Figure 1B:
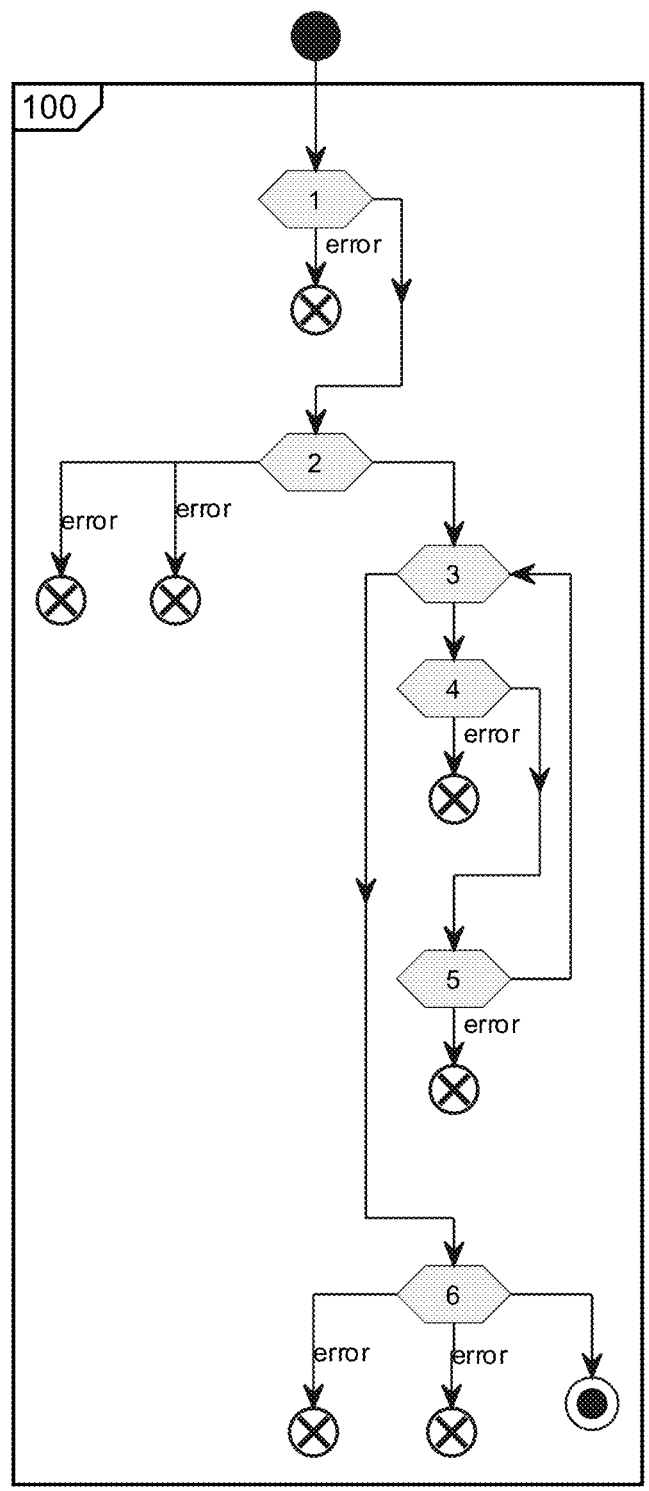
FIG. 1B shows an exemplary activity diagram describing the cryptographic promissory file verification process in accordance with embodiments of the present invention.

FIG. 1B shows an activity diagram describing the cryptographic promissory file 100 verification process 103 which may be executed on a general computing system (e.g., mainframe, Linux container, virtualized computer, personal computer or other general computing device) with or without Internet connectivity. FIG. 1B step 1 is to load and deserialize the cryptographic promissory file 100 from stored binary code. Verification process 103 will error if deserialization of cryptographic promissory file 100 fails. FIG. 1B step 2 checks the authority 200 and delegated currency issuer 300 public key identities of the cryptographic promissory file 100 compared against known public key identities. If either of those identities do not match known identities for the public keys stored in the promissory file 100, then cryptographic promissory file is invalid and will result in an error. Additionally, FIG. 1B step 2 illustrates that if a root signature block 102 does not exist for a cryptographic promissory file 100 the file is invalid and will result in an error. FIG. 1B step 3 illustrates a while loop to recurse the signature block linked-list hash chain 102 until the root or genesis signature block is found. FIG. 1B step 4 calculates the current hash of the most recent signature block 102 from the prior signature blocks 102n. FIG. 1B step 5 illustrates that if the number of signature blocks 102 does not equal the block depth of the promissory file 100, then the verification process will result in an error. FIG. 1B step 6 performs two checks; first to ensure the secured signature matches current signature block 102 hash for the public key found in the previous signature block 102 to verify that the prior owner has assigned a new owner; and second, to ensure the authorized signature for the current signature block 102 hash matches either the authority or delegated currency issuer public key. Importantly, if only the secured signature is valid and the authorized signature is not present, then the cryptographic promissory file 100 is "pending authorization" and may not be further transferred or assigned to a new owner until a valid authorized signature is provided in the cryptographic promissory file 100. The requirement of both the secured signature and the authorized signature acts as a two-phase lock on the cryptographic promissory file 100, where the first phase is a local, preparatory process to record the secured signature from the current owner for the transfer of the cryptographic promissory file 100 to a new owner recorded a new signature block 102 with the new owner's public key. Without the authorization signature from the authority or delegated currency issuer of the cryptographic promissory file 100, the file is locked in a "pending authorization" state and cannot be transferred to a new owner. The second phase of the cryptographic promissory file 100 is to obtain the authorized signature for the latest signature block 102 in the file. Only after verifying the validity of both the secured signature and the authorized signature is the cryptographic promissory file 100 authorized and may be assigned to a new owner. In one or more embodiments of the invention, cryptographic promissory files 100 enable a concurrent, high-volume cryptographic digital money infrastructure for reserve and commercial monetary transactions.

Figure 1C:
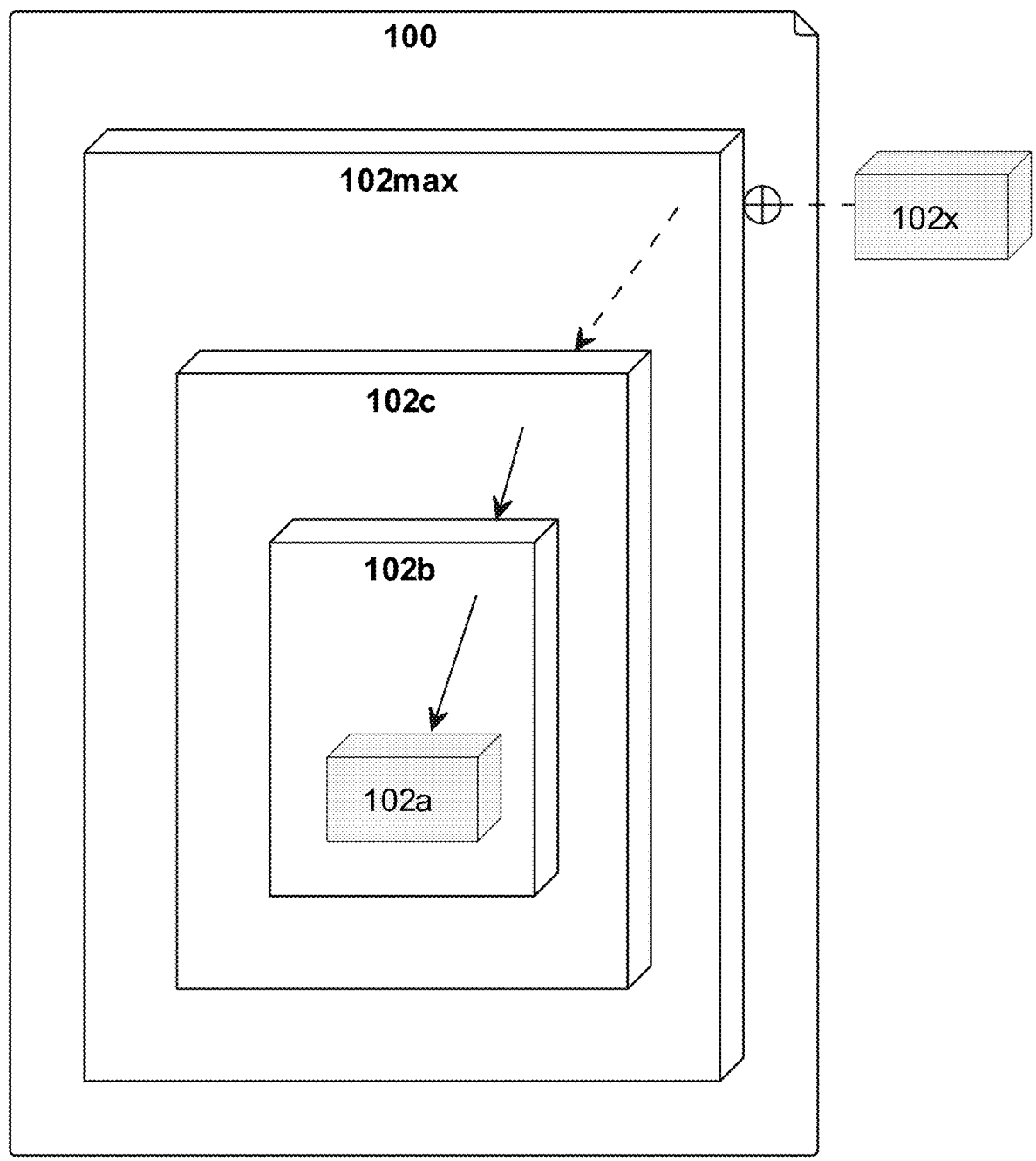
FIG. 1C shows an exemplary deployment diagram of a cryptographic promissory file demonstrating the stack depth compiler constraints of the recursive signature block linked-list hash chain in accordance with embodiments of the present invention.

FIG. 1C illustrates cryptographic promissory file 100 and its recursive signature block linked-list hash chain 102 describing a predicate in which its max block depth 104 is reached, denying an additional signature block 102 from being committed to cryptographic promissory file 100. The purpose of the signature block 102 max block depth 104 is to limit cryptographic promissory files 100 from growing in perpetuity. Using a recursive signature block structure 102 lends itself to enforcing compiler stack depth constraints on the number of signature blocks 102 that may be added to cryptographic promissory file 100. Once cryptographic promissory file 100 reaches its max block depth 104 limit, no further signature blocks may be permitted for cryptographic promissory file 100 to be transferred. Effectively, cryptographic promissory file 100 has reached its finite life and must be archived for reporting. Another cryptographic promissory file 100 may be issued to replace the retired cryptographic promissory file 100. In one embodiment of the present invention, the stack depth limit of the recursive signature block linked-list hash chain 102 provides guarantees against the non-reporting of cryptographic promissory files 100 amongst replicated authority services 200 and delegated currency issuer services 300.

Figure 2A:
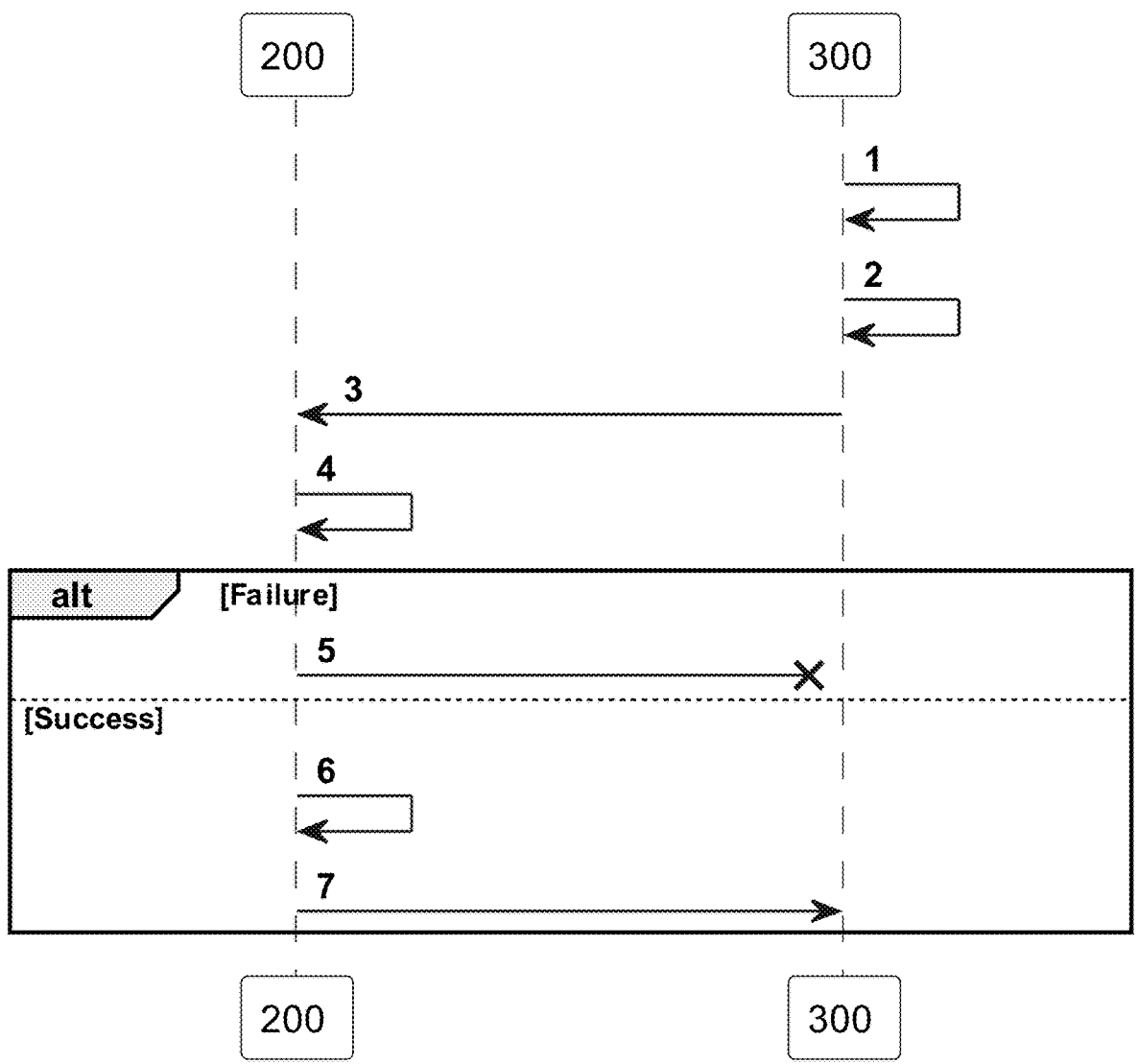

FIG. 2A and FIG. 2B illustrate a monetary authority service 200 and a delegated currency issuer service 300. Services 200 and 300 may be executed on a general computing system (e.g., mainframe, Linux container, virtualized computer, personal computer or other general computing device) located on premise or remotely, accessible using an Internet Protocol (IP) address. As illustrated in FIG. 2A step 1, delegated currency issuer service 300 initializes a cryptographic key pair used to register service 300 with an authority service 200. FIG. 2A step 2 indicates that delegated currency issuer service 300 cryptographic signs a message containing its public key identity using its asymmetric private key corresponding to the public key identity. FIG. 2A step 3 indicates service 300 registering its public key with authority service 200. FIG. 2A step 4 indicates authority service 200 checking to ensure the cryptographic signature of delegated currency issuer service 300 matches its public key identity, demonstrates ownership of the private key. FIG. 2A step 5 is an alternative response if the check if the previous step fails, in which delegated currency issuer service 300 will receive an invalid request response. FIG. 2A step 6 indicates authority service 200 records delegated currency issuer services 300 public key identity, establishes currency issuance limits corresponding to delegated currency issuer service 300 and records the current issued cryptographic promissory file(s) 100 amounts for each delegated currency issuer service 300. One of ordinary skill in the art will appreciate that the currency issuance limits, and public key identities may be recorded in a database or other persistent storage system. FIG. 2A step 7 shows authority service 200 responding with an available cryptographic promissory file 100 issuance limit to delegated currency issuer service 300. Once delegated currency issuer service 300 has established its currency limit with the authority service 200, delegated currency issuer service 300 may issue cryptographic promissory file(s) 100 up to the total issuance limit available to the delegated currency issuer service 300.

FIG. 2B step 1 illustrates delegated currency issuer service 300 requesting the public key identity from authority service 200. FIG. 2B step 2 illustrates authority service 200 responding with its public key identity to delegated currency issuer service 300. FIG. 2B step 3 illustrates delegated currency issuer service 300 using the public key identity of authority service 200 and its own public key identity to establish the authority and the issuer public key identities in each cryptographic promissory file 100. FIG. 2B step 3 further illustrates delegated currency issuer 200 using its private key created in FIG. 2A step 1 to cryptographically sign the root signature block 102 hash of each cryptographic promissory file 100, and store the signature as the secured signature within the file. Cryptographic promissory file(s) 100 are not valid until authority service 200 provides an authorized signature for each file 100 matching the public key for the authority set in the file. FIG. 2B step 4 shows delegated currency issuer service 300 sending cryptographic promissory file(s) 100 to authority service 200 for authorization. FIG. 2B step 5 shows authority service 200 validating the cryptographic signature of delegated currency issuer service 300 for each cryptographic promissory file 100. FIG. 2B step 6 demonstrates a failure of authority service 200 to validate cryptographic promissory file(s) 100 based on the verification method 103 described in FIG. 1B. FIG. 2B step 7 illustrates authority service 200 providing an authorized signature for each cryptographic promissory file 100 and reducing the available issuance limit for delegated currency issuer service 300 based on the denominated value of each cryptographic promissory file(s) 100. FIG. 2B step 8 shows authority service 200 responding to delegated currency issuer service 300 with the fully signed and authorized cryptographic promissory file(s) 100. Service 300 may be represented as a commercial bank or other financial institution that is involved in the issuance and distribution of promissory file(s) 100. One of ordinary skill in the art will appreciate that the cryptographic signing keys for services 200 and 300 may be stored in an ancillary service, such as a hardware security module (HSM). In one or more embodiments of the invention, services 200 and 300 enable a concurrent, high-volume cryptographic digital infrastructure for reserve and commercial monetary transactions.

Figure 2C:
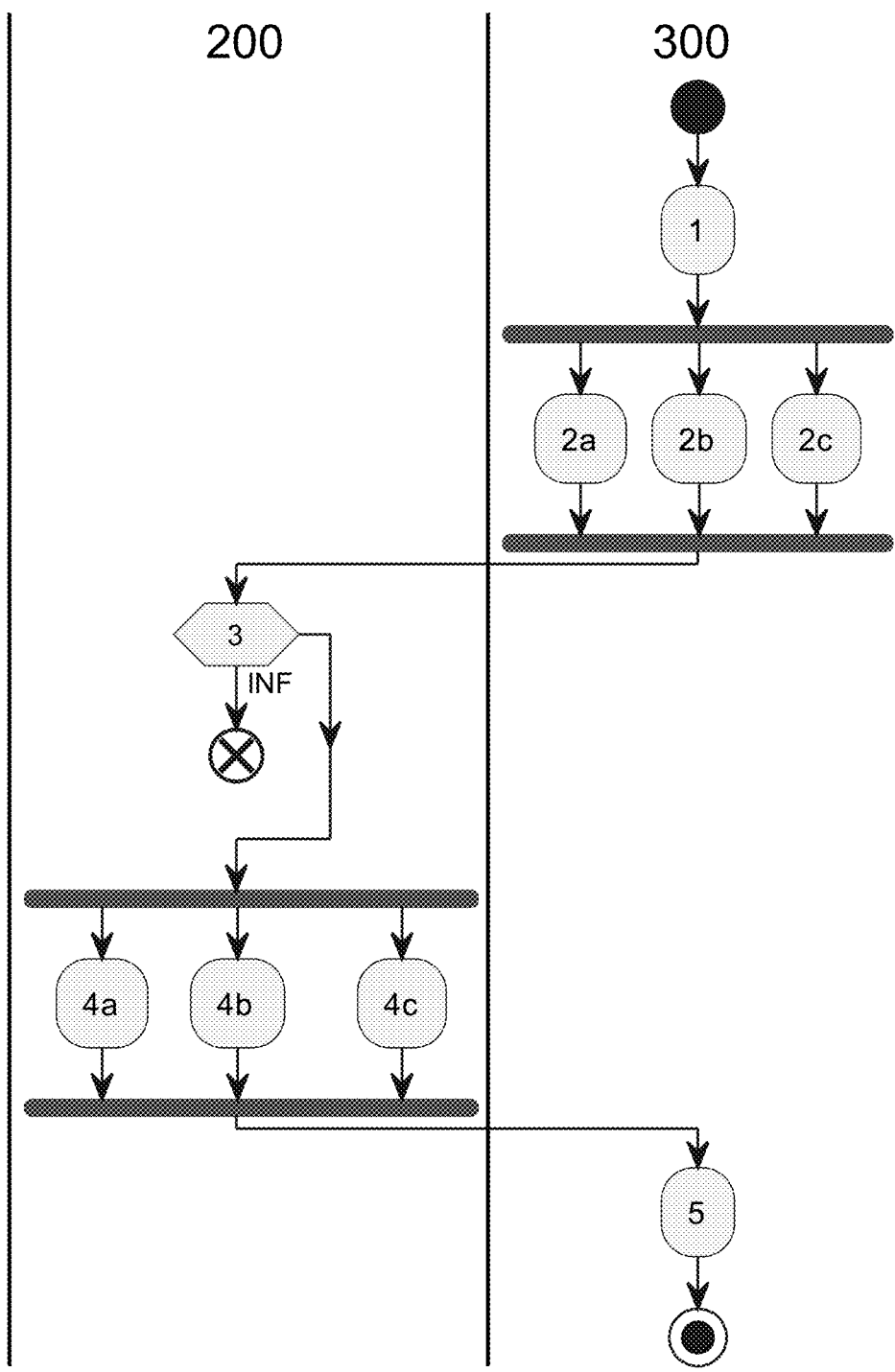
FIG. 2C shows an exemplary flow chart illustrating the process and systems for issuing cryptographic promissory files in accordance with embodiments of the present invention.

FIG. 2C illustrates the parallel processing of issuing and authorizing cryptographic promissory files 100 by delegated currency issuer service 300 and authority service 200. FIG. 2C step 1 describes delegated currency issuer service 300 preparing a batch of cryptographic promissory files 100 to be issued. FIG. 2C steps 2*a*, 2*b* and 2*c* describe the parallel processing of cryptographically signing the root signature block 102 in each cryptographic promissory file 100 within a batch. FIG. 2C step 3 shows authority service 200 debiting the issuance limit of delegated currency issuer service 200, checking for insufficient funds if the net batch amount of cryptographic promissory files 100 exceeds the issuance limit of delegated currency issuer service 200. FIG. 2C steps 4*a*, 4*b* and 4*c* describes the parallel processing of authority service 200 for cryptographically signing the signature block 102 of each cryptographic promissory file 100 to provide an authorized signature. FIG. 2C step 5 describes the return of the fully authorized and issued cryptographic promissory files 100 from authority service 200 to delegated currency issuer service 300.

Figure 3:
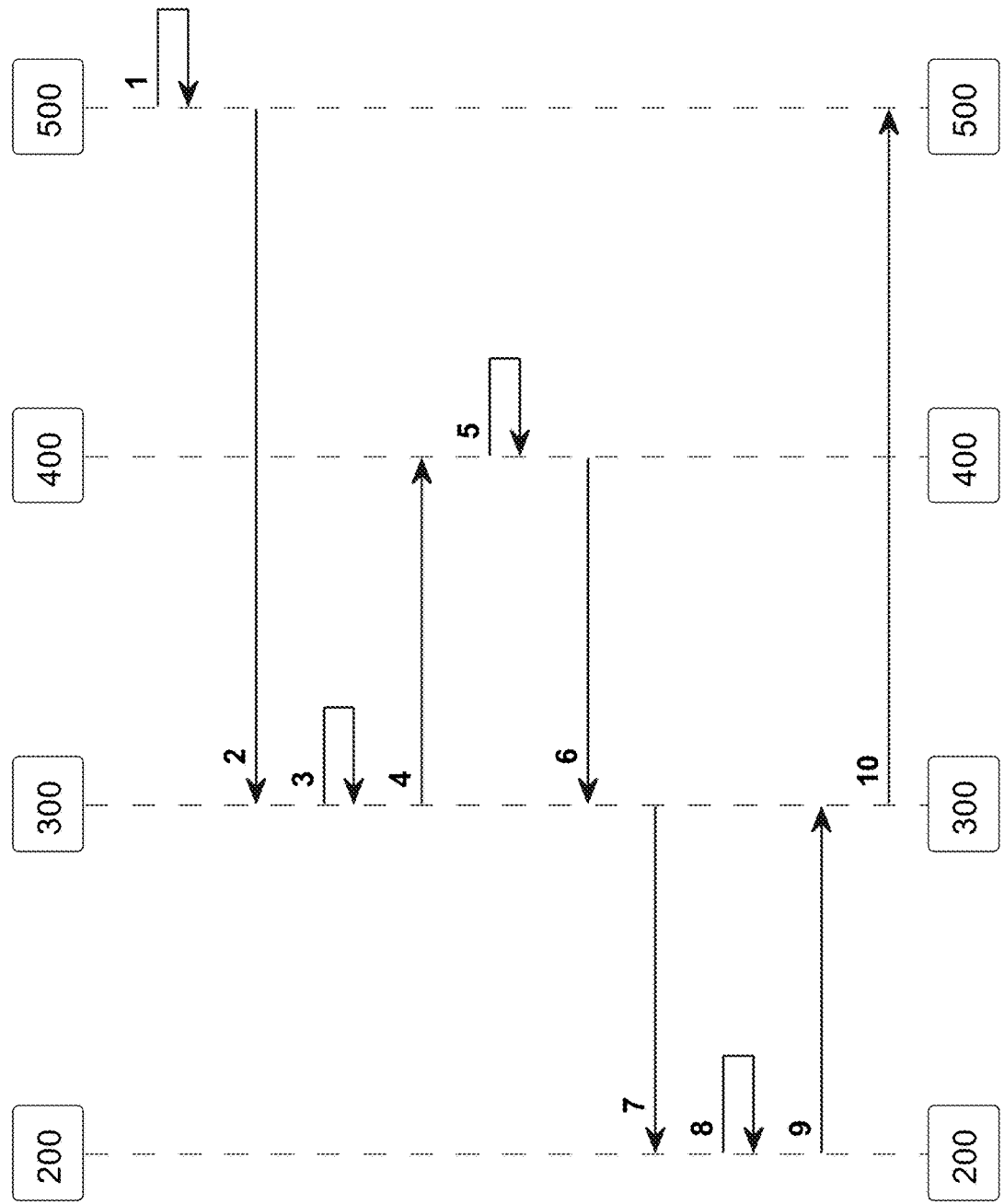
FIG. 3 shows an exemplary sequence diagram illustrating the interactions between a remote device, a delegated currency issuer service, a sanctions service, and an authority service to distribute cryptographic promissory files in accordance with embodiments of the present invention.

FIG. 3 illustrates the interactions of a remote device 500 (e.g., mobile phone, personal computer, laptop, tablet, etc.), a delegated currency issuer service 300, a sanctions service 400, and an authority service 200 demonstrating an exemplary process for distributing cryptographic promissory file(s) 100. FIG. 3 step 1 demonstrates remote device 500 initializing a cryptographic key pair used to identify the remote device and to cryptographically sign promissory file(s) 100. FIG. 3 step 2 shows remote device 500 requesting funds from the delegated currency issuer service 300, providing its public key and personally identifiable information (PII), if not previously available. One of ordinary skill in the art will appreciate 500 may request promissory file(s) 100 through a loan or other mechanism for distributing funds. FIG. 3 steps 3 through 5 demonstrates delegated currency issuer service 300 sending remote device 500 user PII to sanctions service 400 to assert remote device 500 is permitted to hold and transact cryptographic promissory file(s) 100. FIG. 3 step 6 shows delegated currency issuer 300 transferring ownership of cryptographic promissory file(s) 100 by creating a new signature block with the public key of remote device 500, providing a secured signature for each promissory file 100. FIG. 3 step 7 shows delegated currency issuer 300 sending cryptographic promissory file(s) 100 to authority service 200 to receive an authorized signature for each file. FIG. 3 step 8 shows authority service 200 signing the latest signature block for each cryptographic promissory file 100, updating each file with an authorized signature. FIG. 3 step 9 shows authority service 200 returning the authorized cryptographic promissory file(s) 100 to delegated currency issuer 300. FIG. 3 step 10 shows delegated currency issuer 300 sending the authorized cryptographic promissory file(s) 100 to remote device 500.

Figure 4:
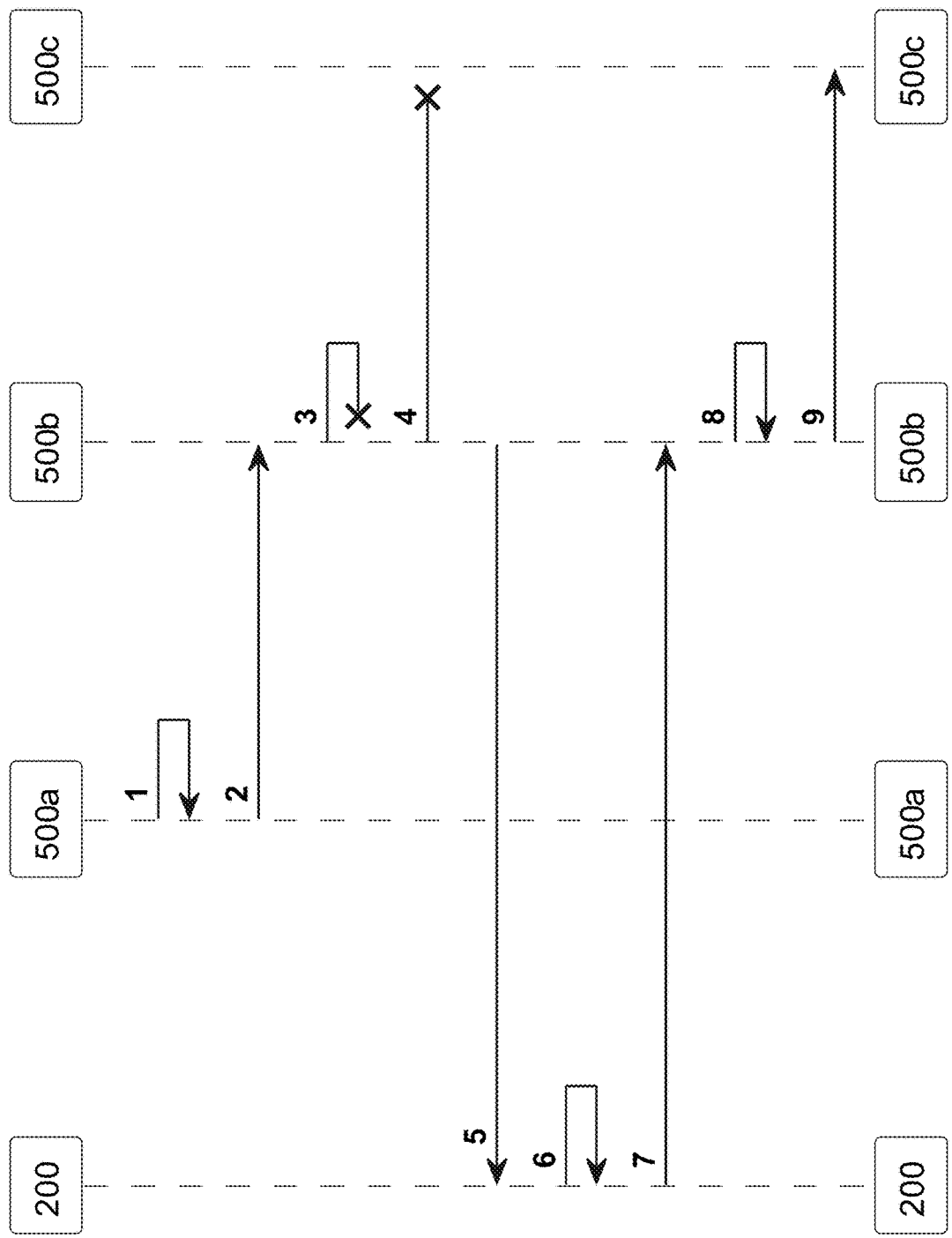
FIG. 4 shows a sequence diagram of a peer-to-peer cryptographic promissory file transaction between remote devices and an authority service, demonstrating the ability for the file to be sent between two peers without the presence of an authorized signature from the monetary authority service in accordance with embodiments of the present invention.

FIG. 4 shows sequence diagram of a peer-to-peer cryptographic promissory file 100 transactions between remote devices 500*a*, 500*b* and 500*c* and authority service 200. Illustrated in FIG. 4 is a "pending-authorization" cryptographic promissory file 100 transaction between 500*a* and 500*b*, demonstrating the ability for a cryptographic promissory file 100 to be sent between two peers without the presence of an authorized signature from the monetary authority service 200. FIG. 4 step 1 shows remote device 500*a* locally signing cryptographic promissory file 100. FIG. 4 step 2 shows remote device 500*a* sending the promissory file 100 to remote device 500*b* directly. Cryptographic promissory file(s) 100 are considered "pending-authorization" and are not considered settled until authority service 200 provides an authorized signature for each promissory file 100. Notably, this interaction demonstrates the ability for a promissory file 100 to be sent between peers over agnostic OSI networks without the need for a third party to be involved in the transacting of a cryptographic promissory file 100. FIG. 4 step 3 illustrates that the promissory file 100 is not considered settled until 500*b* is able to obtain an authorized signature for the promissory file 100 and may not be transferred by 500*b* until having received an authorized cryptographic signature for the promissory file 100 from authority service 200. One of ordinary skill in the art will appreciate that the authorized signature of a promissory file 100 can be obtained asynchronously from an authority service 200, for example when remote device 500*b* connects to the Internet. FIG. 4 step 3 further illustrates that 500*a* may be able to send a fraudulent or "double spent" promissory file 100 to 500*b*, and that 500*b* will not be able to determine whether the promissory file 100 has been previously transferred in a prior transaction without receiving an authorized signature from authority service 200 for the cryptographic promissory file 100 validating ownership. FIG. 4 steps 4 through 9 illustrates that the promissory file 100 cannot be sent to another peer, 500*c*, without 500*b* first receiving an authorized signature from authority service 200 for the latest signature block 102 of the promissory file 100. Remote device 500*b* is prohibited from further transferring "pending-authorization" cryptographic promissory file(s) 100 to remote device 500*c* until receiving an authorized signature for each cryptographic promissory file 100. One of ordinary skill in the art will understand sending "pending-authorization" promissory file(s) 100 should only be done when the counter parties are able to trust each other, or when counter-party risk is low. One of ordinary skill in the art will notice that sending a "pending-authorization" promissory file 100 can enable the offline transacting of a promissory file 100. This feature may be of importance in one or more examples of the invention, specifically during instances when internet connection may not be available but a transfer of cryptographic promissory file(s) 100 is desired, or as a fault tolerance feature when a monetary authority service 200 or delegated currency issuer service 300 is unavailable.

FIG. 5 shows a sequence diagram where remote device 500*a* sends cryptographic promissory file(s) 100 to authority service 200 to authorize cryptographic promissory file(s) 100 before remitting to remote device 500*b*. FIG. 5 step 1 indicates remote device 500*a* locally providing a secured signature on cryptographic promissory file(s) 100 assigning ownership to 500*b* using the public key identity of remote device 500*b*. FIG. 5 step 2 shows remote device 500*a* requesting an authorized signature for cryptographic promissory file(s) 100 from an authority service 200. FIG. 5 step 3 indicates authority service 200 verifying cryptographic promissory file(s) 100, providing an authorized signature for the latest signature block 102 for each cryptographic promissory file 100. FIG. 5 step 4 illustrates in one embodiment of the invention authority service 200 may remit the fully authorized cryptographic promissory file(s) 100 to remote device 500*b* using its public key identity found in the cryptographic promissory file 100, without routing through remote device 500*a*. FIG. 5 step 5 illustrates that cryptographic promissory file(s) 100 received by remote device 500*b* may be verified to be owned by remote device 500*b*.

FIG. 6A illustrates remote device 500*a* sending cryptographic promissory file(s) 100 to remote device 500*b* using a remittance service 600 to perform an atomic transfer of cryptographic promissory file(s) 100 from remote device 500*a* in excess of the amount of funds to be transferred to remote device 500*b*. One of ordinary skill in the art will appreciate remote device 500*a* may desire to use remittance service 600 to ensure 500*b* is unable to withhold any residual change that would otherwise be returned to 500*a* if the remitting service 600 was not used. FIG. 6A step 1 illustrates remote device 500a assigning ownership of cryptographic promissory file(s) 100 to remittance service 600. FIG. 6A step 2 illustrates remote device 500a sending a remittance request with "pending authorization" cryptographic promissory file(s) 100 to remittance service 600 for processing. FIG. 6A step 3 illustrates remittance service 600 requesting sanctions checks for remote devices 500a and 500b based on their public key identities associated with registered personally identifiable information (PII). FIG. 6A step 4 illustrates sanctions service 400 screening the identities of remote devices 500a and 500b. FIG. 6A step 5 indicates sanctions check failure for either remote device 500a or 500b, returning a failed response to remittance service 600. FIG. 6A step 6 illustrates remittance service 600 returning a failure response to remote device 500a. FIG. 6A step 7 illustrates a successful response from sanctions service 400 to remittance service 600. FIG. 6 step 8 illustrates remittance service 600 assigning cryptographic promissory file(s) 100 to remote device 500b. Additionally, FIG. 6A step 8 illustrates remittance service 600 assigning cryptographic promissory file(s) 100 to remote device 500a for residual change to be returned. FIG. 6A steps 9 through 11 indicate remittance service 600 requesting an authorized signature for each cryptographic promissory file 100. FIG. 6A step 12 illustrates remittance service 600 remitting cryptographic promissory file(s) 100 to remote device 500b. FIG. 6A step 13 illustrates remittance service 600 returning cryptographic promissory file(s) 100 to remote device 500a in the residual amount owed to remote device 500a.

Figure 6B:
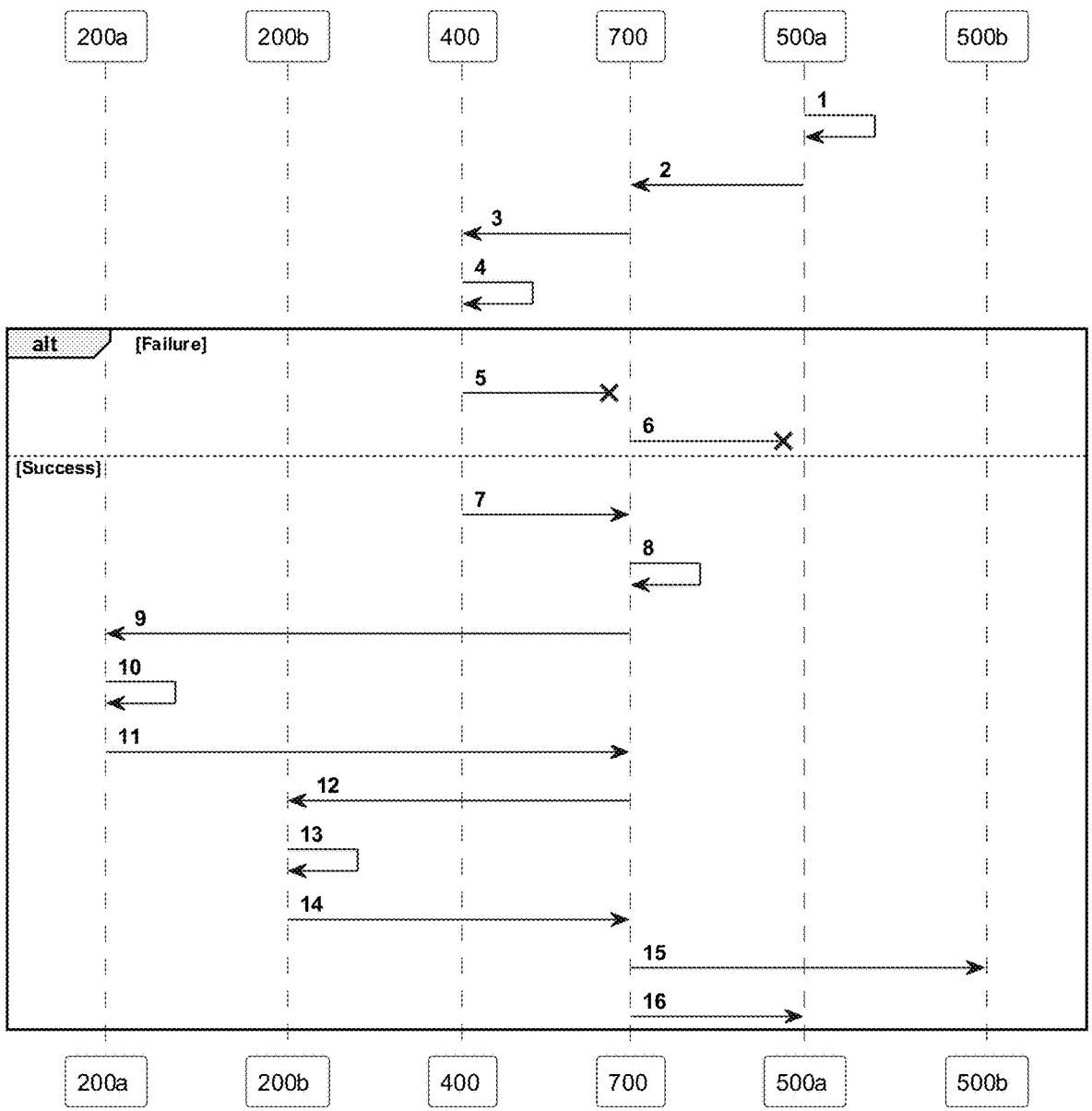
FIG. 6B shows an exemplary sequence diagram illustrating systems for foreign currency exchange of promissory files in accordance with embodiments of the present invention.

FIG. 6B shows a sequence diagram illustrating remote device 500a remitting funds to remote device 500b denominated in a foreign currency using a foreign currency exchange service 700. Foreign currency exchange service 700 communicates with various monetary authority service 200 instances for receiving an authorized signature in their respective currency denominations. Foreign currency exchange service 700 additionally communicates with sanctions screening service 400. Foreign currency exchange service 700 may hold promissory file(s) 100 denominated in various currencies (e.g., USD, EUR, GBP, JPY, etc.). FIG. 6B steps 1 through 11 are like FIG. 6A steps 1 through 11. FIG. 6B introduces additional steps 12 through 14 to illustrate the communication with a foreign currency authority service 200b. FIG. 6B steps 9 through 14 demonstrates foreign currency exchange service 700 requests authorization signatures from authority services 200a and 200b to complete a foreign currency exchange. FIG. 6B steps 15 and 16 illustrate the remittance cryptographic promissory file(s) 100 to remote devices 500b and residual change to 500a, each receiving the monetary amounts in foreign and local currency denominations, respectively.

Figure 7:
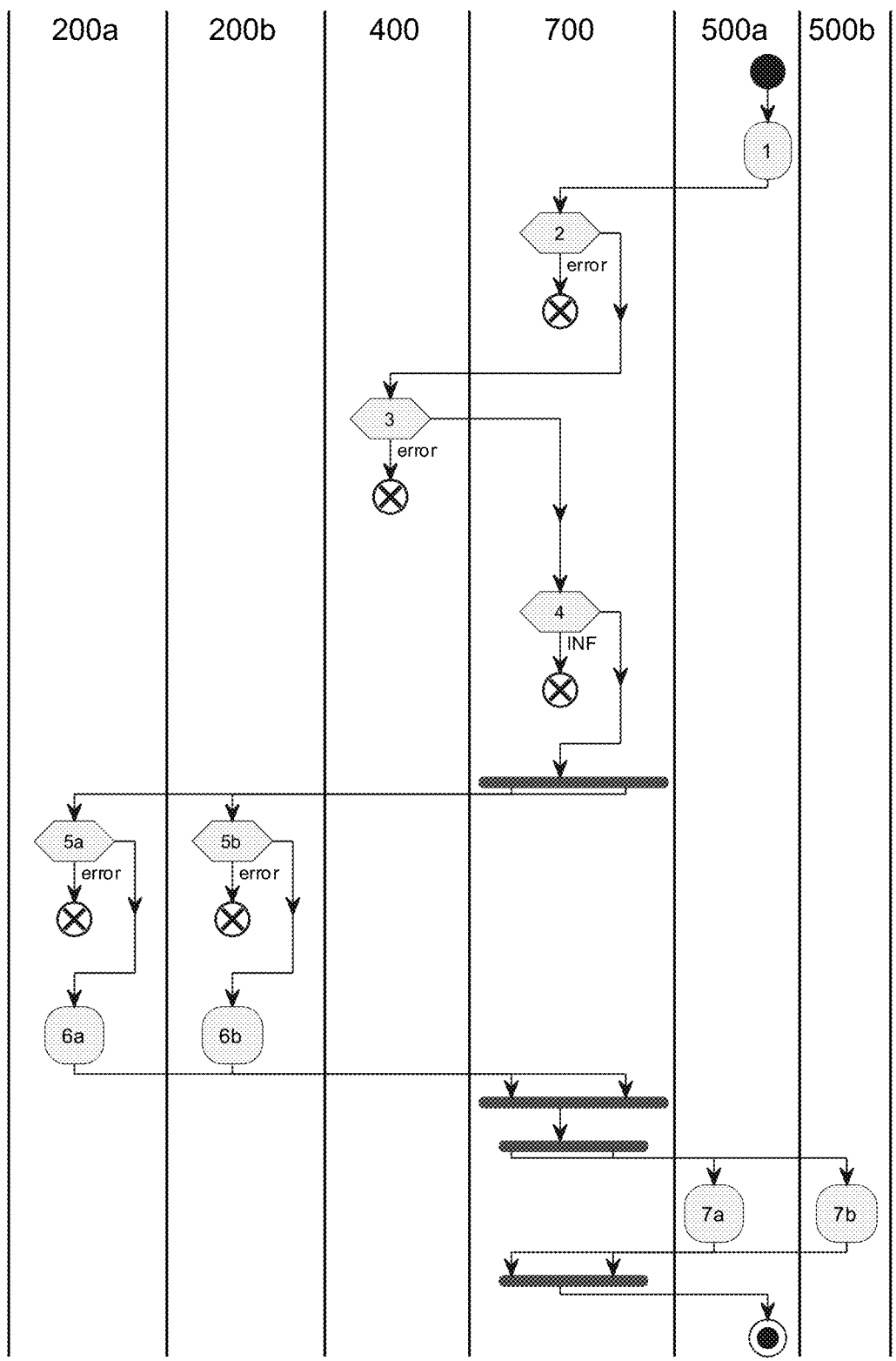
FIG. 7 shows a flow chart for a foreign exchange service that conducts a transaction involving the exchange of cryptographic promissory files in accordance with embodiments of the present invention.

FIG. 7 illustrates an exemplary flow chart with foreign exchange service 700 remitting cryptographic promissory files 100 for remote device 500a to remote device 500b. FIG. 7 shows foreign exchange service 700 checking sanctions service 400 before requesting authorized signatures for cryptographic promissory files 100 from authority services 200a and 200b corresponding to the local and foreign denominated cryptographic promissory files 100 being exchanged. FIG. 7 step 1 indicates remote device 500a assigning ownership of cryptographic promissory files 100 to foreign exchange service 700. FIG. 7 step 2 indicates foreign exchange service 700 validating the request from remote device 500a, ensuring cryptographic promissory files 100 are correctly assigned to foreign exchange service 700 for processing. FIG. 7 step 3 illustrates sanctions service 400 performing anti-money laundering checks on remote devices 500a and 500b, if either remote device 500 fails sanctions screening, the transaction is aborted. FIG. 7 step 4 indicates foreign exchange service 700 checking its treasury holdings to perform the exchange. If foreign exchange service 700 does not have the corresponding foreign denominated cryptographic promissory file(s) 100 to complete the exchange, the transaction is aborted. FIG. 7 steps 5a, 5b, 6a and 6b describe concurrent processing of authorizing cryptographic promissory file(s) 100 by authority services 200a and 200b representing two foreign monetary authorities authorizing their respective cryptographic promissory files 100. FIG. 7 steps 7a and 7b illustrates foreign currency exchange service 700 remitting cryptographic promissory files 100 to remote device 500a and 500b in their respective foreign and local denominated currencies.

Figure 8:
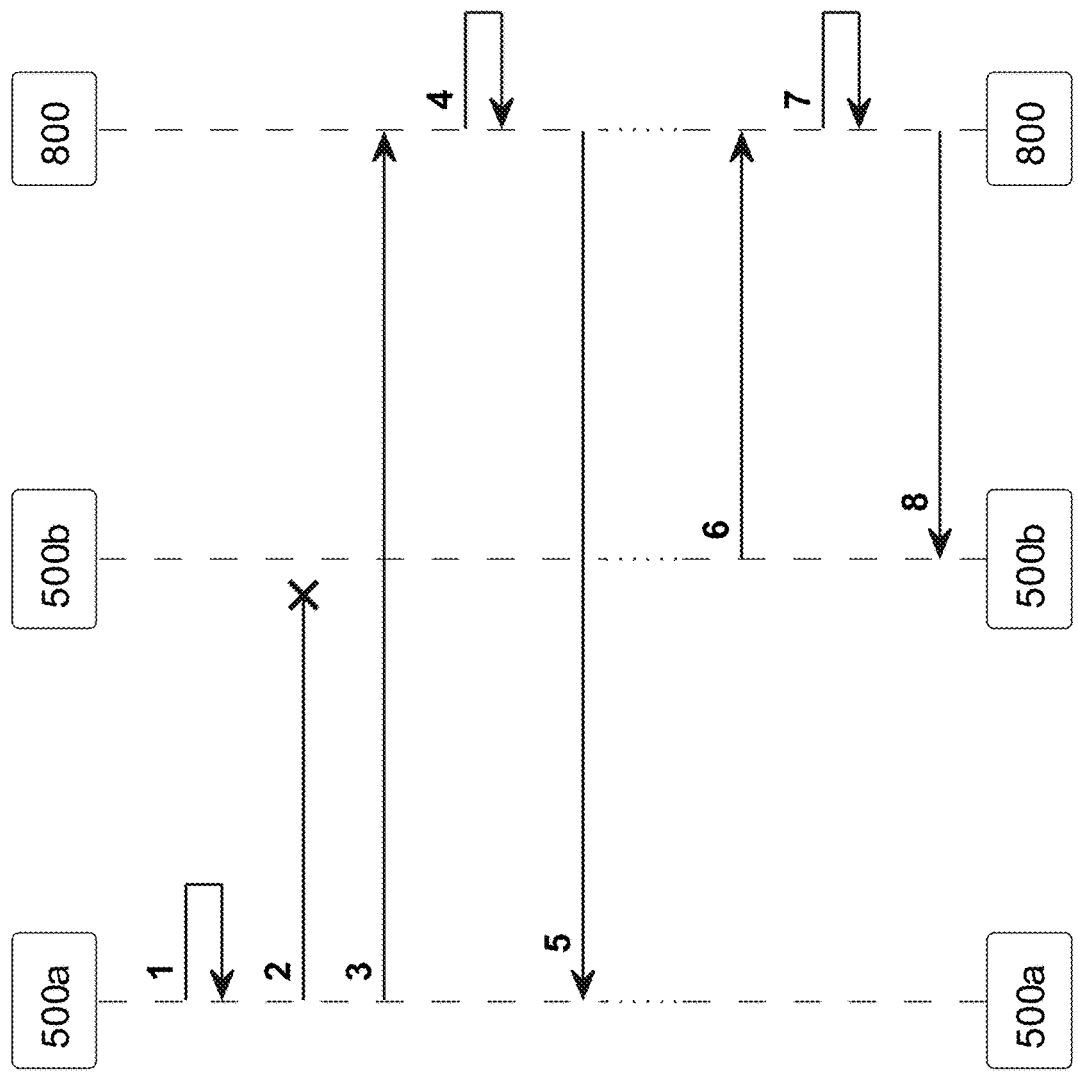
FIG. 8 shows a sequence diagram illustrating custodian service serving as a storage for cryptographic promissory files, using public key identities to authenticate and claim ownership of cryptographic promissory files in accordance with embodiments of the present invention.

FIG. 8 illustrates a sequence diagram demonstrating a custodian service 800, holding cryptographic promissory file(s) 100 for remote devices 500a and 500b. FIG. 8 step 1 indicates remote device 500a cryptographically signing ownership of cryptographic promissory file(s) 100 to remote device 500b. FIG. 8 step 2 illustrates remote device 500a is unable to send cryptographic promissory file(s) 100 to remote device 500b. FIG. 8 step 3 illustrates remote device 500a sending cryptographic promissory file(s) 100 to custodian service 800 for the benefit of remote device 500b. FIG. 8 step 4 illustrates custodian service 800 storing cryptographic promissory file(s) 100. FIG. 8 step 5 illustrates remote device 500b requesting from custodian service 800 cryptographic promissory file(s) 100 belonging to remote device 500b. Remote device 500b must provide proof of its public key ownership by cryptographically signing a byte payload with its corresponding private key. FIG. 8 step 6 illustrates custodian service 800 retrieving cryptographic promissory file(s) 100 belonging to remote device 500b. FIG. 8 step 7 illustrates custodian service 800 responding to remote device 500b with cryptographic promissory file(s) 100. Custodian service 800 serves as a mailbox solution for cryptographic promissory files 100, using the public key identities to authenticate and claim ownership of the cryptographic promissory files 100. One of ordinary skill in the art will appreciate cryptographic promissory files 100 may be stored in a relational database, key-value database, file system or other persistent storage solution. In one embodiment of the invention, custodian service 800 provides a high availability storage and retrieval solution in the event a remote device 500 is unreachable to receive a cryptographic promissory file 100.

Figure 9:
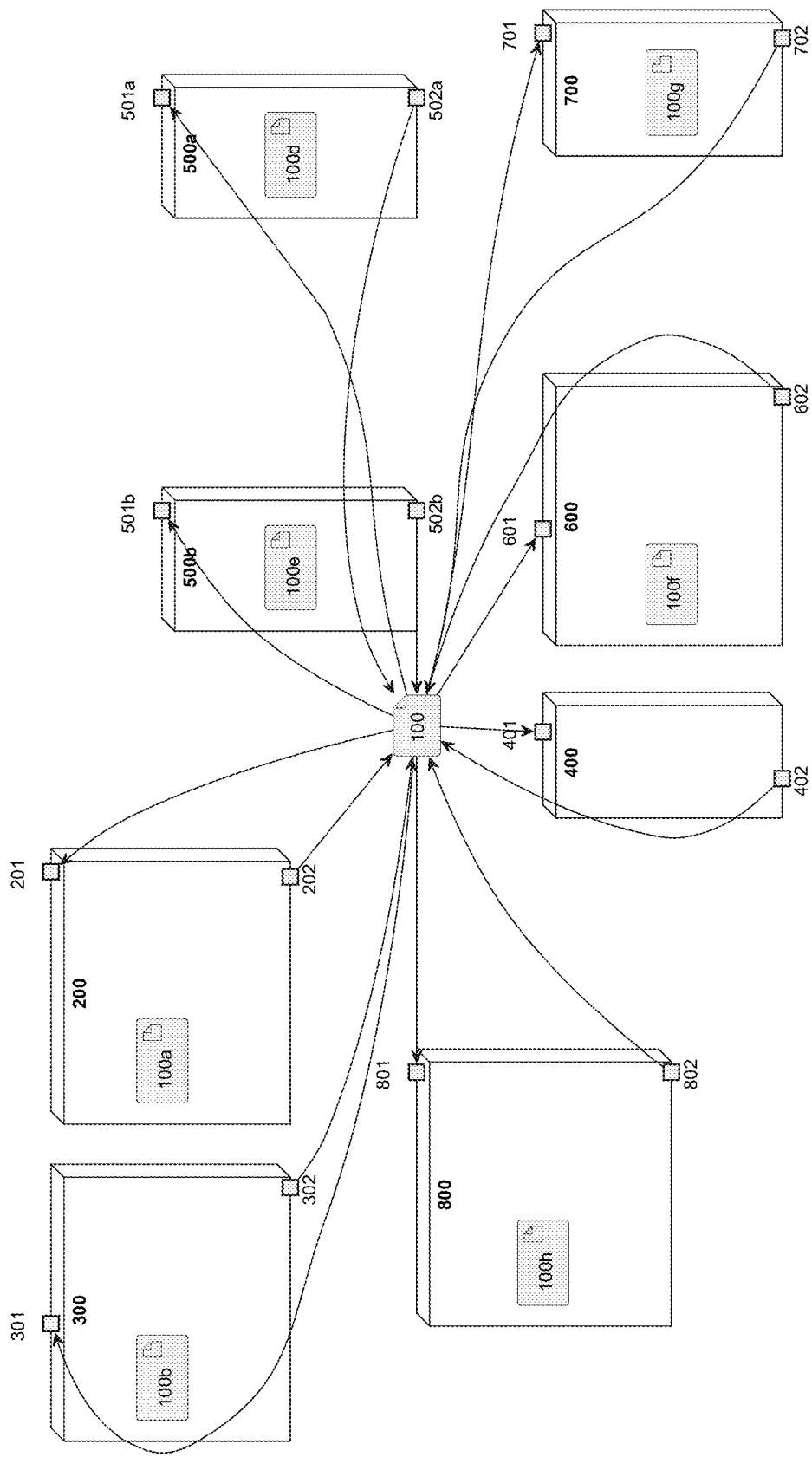
FIG. 9 illustrates a deployment diagram of systems for processing cryptographic promissory files, including several services and remote devices with interfaces for receiving and sending cryptographic promissory files in accordance with embodiments of the present invention.

FIG. 9 illustrates a deployment diagram of systems for processing cryptographic promissory files 100. FIG. 9 shows cryptographic promissory file 100 as acted up by authority service 200, delegated currency issuer service 300, sanctions service 400, remote devices 500a and 500b, remittance service 600, foreign exchange service 700 and custodian service 800. Each service is illustrating with an interface for receiving and sending cryptographic promissory files 100. FIG. 9 shows authority service 200 with input 201 and output 202 interfaces for authorizing cryptographic promissory files 100. FIG. 9 shows delegated currency issuer service 300 with input 301 and output 302 for issuing cryptographic promissory files 100. FIG. 9 illustrates sanctions service 400 with input 401 and output 402 for sanctions screening of cryptographic promissory files 100. FIG. 9 illustrates remote devices 500a and 500b with inputs 501a and 501b and outputs 502a and 502b, respectively, for receiving and sending cryptographic promissory files 100. FIG. 9 illustrates remittance service 600 with input 601 and output 602 for remitting and returning residual change of cryptographic promissory files 100. FIG. 9 illustrates foreign exchange service 700 with input 701 and output 702 for exchanging cryptographic promissory files 100 into foreign denominated cryptographic promissory files 100, remitting and returning residual change of cryptographic promissory files 100. FIG. 9 illustrates custodian service 800 with input 801 and output 802 for storing and retrieving cryptographic promissory files 100 for benefit of cryptographic promissory file 100 owners.

Figure 10:
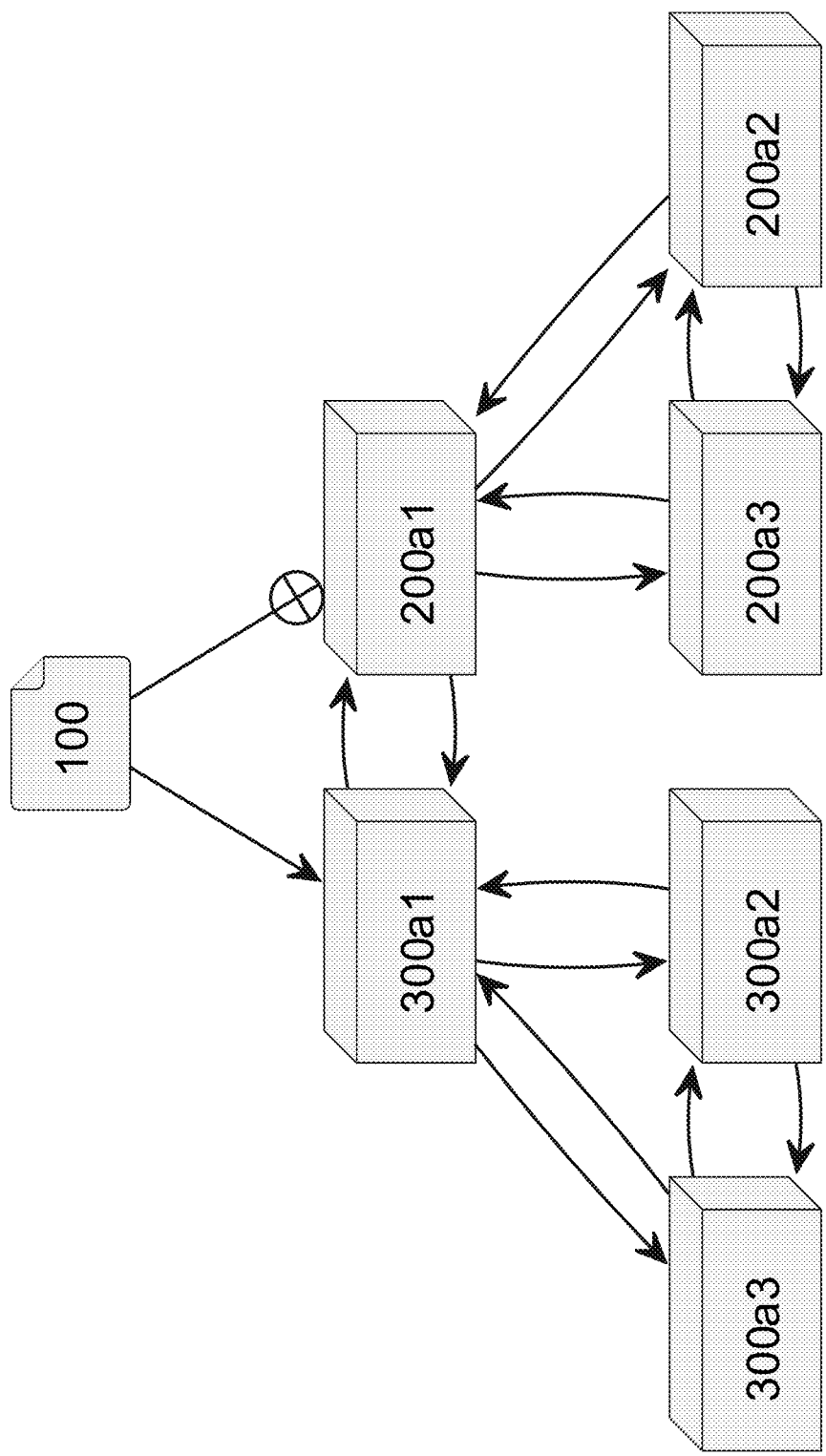
FIG. 10 illustrates the replication of cryptographic promissory files amongst authority services and delegated currency issuer services in accordance with embodiments of the present invention.

FIG. 10 illustrates a deployment diagram indicating the replication of cryptographic promissory file 100 amongst authority services 200a1, 200a2 and 200a3 and delegated currency issuer services 300a1, 300a2 and 300a3. FIG. 10 shows that if authority service 200a1 is unavailable to receive cryptographic promissory file(s) 100, delegated currency issuer services 300a1, 300a2 and 300a3 may replicate cryptographic promissory file 100 state with authority services 200a1, 200a2 and 200a3. FIG. 10 illustrates fault tolerances amongst authority service 200 and delegated currency issuer service 300. One of ordinary skill in the art will appreciate different replication algorithms (e.g., Raft, Paxos, etc.) may be used to maintain a consensus amongst replicated services for asserting the current state of cryptographic promissory files 100. Additionally, one of ordinary skill in the art will appreciate cryptographic promissory files 100 may be stored on a variety of different persistent volumes, including databases with built-in multi-region replication and fault tolerances.

In an exemplary embodiment, a method for constructing a cryptographically signable and verifiable binary promissory file representing fiat currency issued by a monetary authority or delegated currency issuer, comprises: a universally unique identifier, ISO-4217 currency code, 64-bit unsigned integer amount, 32-bit unsigned integer decimal precision, cryptographic public key of the monetary authority, cryptographic public key of the delegated currency issuer, 64-bit integer representing the promissory file issuance date Unix timestamp, cryptographic signature of the latest signature block hash from the authority, cryptographic signature of the latest block hash from the previous promissory file owner or the delegated currency issuer, unsigned integer of the signature block depth, recursive linked-list hash-chain signature block data structure containing cryptographic public key of the promissory holder at the signature block depth, hash of either (i) the hash digest of the previous hash plus the cryptographic public key at the same signature block depth or (ii) the genesis hash digest of cryptographic public key of the delegated currency issuer plus the universally unique identifier of the promissory plus the issuance date timestamp of the promissory plus the decimal precision of the promissory plus the currency code of the promissory, the previous linked signature block data structure, and the Unix timestamp of when the signature block was created.

The above exemplary embodiment can further include: reading the binary file, and returning the values stored therein.

The above exemplary embodiment can further include: calculating and returning the next signature block hash by creating a new hash digest of the current signature block hash plus the cryptographic public key of the intended recipient to transfer the ownership of the promissory file.

The above exemplary embodiment can further include: searching a local or remote file system directory for instances of promissory files and returning a list, array or vector of read file buffers.

The above exemplary embodiment can further include: saving the file name for a promissory file instance based on the character string representation of the promissory ISO-4217 three-letter currency code, 64-bit amount, 32-bit decimal precision, and the universally unique identifier.

The above exemplary embodiment can further include: creating, issuing or minting an instance of a promissory file provided configurable parameters for the randomly generated universally unique identifier, operating system generated issuance date timestamp, 64-bit amount, 32-bit decimal precision, ISO-4217 currency code, cryptographic public key matching the cryptographic signing key, cryptographic signature of the hashed root issuance parameters by the delegated currency issuer cryptographic signing key, cryptographic public key representing the monetary or currency authority, and cryptographic signature of the hashed root issuance parameters by the authority cryptographic signing key; and creating the initial hash for constructing the first signature block signed by the provided cryptographic signing key based on the cryptographic public key of the delegated currency issuer, a randomly created universally unique identifier, issuance date timestamp, and the parameterized amount, decimal and currency code.

The above exemplary embodiment can further include: ordering or sorting based on the equalities of the decimal normalized amounts of comparison promissory files.

The above exemplary embodiment can further include: normalizing a promissory file instance amount against promissory file instances with different decimal place precisions.

The above exemplary embodiment can further include: calculating and returning the root or genesis hash of a promissory file.

The above exemplary embodiment can further include: retrieving the latest signature block of a promissory file.

The above exemplary embodiment can further include: retrieving the previous signature block of a promissory file.

The above exemplary embodiment can further include: retrieving the cryptographic public key of the latest signature block, denoting the owner of the promissory file.

The above exemplary embodiment can further include: recursing the signature block linked list from a starting signature block; and returning the ancestor blocks within the recursed list.

The above exemplary embodiment can further include: restricting the next signature block depth of the promissory file to not exceed a threshold signature block depth.

The above exemplary embodiment can further include: assigning or transferring ownership of the promissory file provided a recipient's cryptographic public key to calculate the next signature block hash and cryptographically sign the hash with the current promissory file owner's cryptographic signing key, supplying the cryptographic signature along with the recipient's cryptographic public address and optional cryptographic signature of the calculated next signature block hash from the monetary authority or delegated currency issuer to be used in the cryptographic verification and construction of the next signature block hash; updating the state of the promissory file; and returning the latest promissory data with the incremented signature block depth.

The above exemplary embodiment can further include: verifying the cryptographic correctness of the promissory file solely from the contents of the promissory file, computing the root hash, recursing the signature block linked-list hash chain and verifying the authorized and secured cryptographic signatures for the latest signature block matches the re-computed linked-list hash-chain from the signature block history; providing the ability to locally verify correctness of the promissory file without reliance on network connectivity.

The above exemplary embodiment can further include: receiving an asynchronous cryptographic signature from the authority of the promissory file that is either (i) the signature for the current signature block hash or, (ii) the signature for pre-authorizing the next computed signature block hash based on a recipient's cryptographic public key; and updating the promissory file's authorized signature.

The above exemplary embodiment can further include: organizing promissory files for a given cryptographic public key in a binary heap to sort from highest to lowest decimal normalized promissory file amounts; and calculating the exact or nearest balance to a parameterized currency amount from a sorted collection, array, vector, tree or mapped data structure of promissory files.

In an exemplary embodiment, a system for issuing promissory files, comprises: processing of computer instructions configured to receive, from a remote computing device using an Internet Protocol (IP) address, instructions for issuing a batch of promissory files given a cryptographic signing key; requesting from an authority, specified at an Internet Protocol (IP) address, a max limit on the face-value amount of promissory files allowed to be issued by and signed for a cryptographic signing and verifying key; receiving back from an authority the current amounts issued by a cryptographic signing key by providing a cryptographic public key; sending a batch of promissory files to an authority, specified at an Internet Protocol (IP) address, to verify and approve the issuance of the promissory files; receiving back a batch of promissory files from an authority with an authorized cryptographic signature from the authority stored within each of the promissory files of the batch; transferring to an authority a batch of promissory files to be destroyed by the authority; transferring to a remote device, using an agnostic Open Systems Interconnection (OSI) model L4 transport layer, issued and authorized promissory files; configuring administrative access to the system based on cryptographic key pairs associated with role based access control (RBAC) rules; receiving from a remote device, using an Internet Protocol (IP) address, a request for cryptographic signing of a batch of promissory files and returning the promissory files to the remote device with an updated authorized signature for each of the promissory files; and returning paginated results for the promissory files issued by a cryptographic signing key, referenced by a cryptographic public key.

In an exemplary embodiment, a system for authorizing promissory files, comprises: processing of computer instructions configured to receive, from a remote computing device using an Internet Protocol (IP) address, a batch of issued promissory files to be authorized by a cryptographic signing key; verifying the cryptographic public key of the issuer for each of the promissory files in a batch; indexing the current ownership of a promissory file associated with a cryptographic public key in persistent storage readable and writable by the system; recording the current total and max limit face-value amount of promissory files issued by a cryptographic signing key, referenced by a cryptographic public key in persistent storage readable and writable by the system; receiving from a remote device, using an Internet Protocol (IP) address, a request for cryptographic signing of a batch of promissory files and returning the batch of promissory files to the remote device with an updated authorized signature for each of the promissory files within the batch; configuring administrative access to the system based on cryptographic key pairs associated with role based access control (RBAC) rules; returning paginated results for the cryptographic public keys authorized by an authority and granted to be promissory file issuers; and searching financial sanction lists to approve or deny the authorization of a promissory file for a cryptographic public key.

In an exemplary embodiment, a system for exchanging foreign denominated promissory files, comprises: processing of computer instructions configured to receive, from a remote computing device using an Internet Protocol (IP) address, a batch of promissory files denominated in one currency to be exchange for a batch of promissory files of equivalent value denominated in another currency; configuring administrative access to the system based on cryptographic key pairs associated with role based access control (RBAC) rules; recording a log of promissory files exchanged in persistent storage readable and writable by the system; returning a forward and spot market exchange rate between currency pairs; and maintaining an order book of promissory files to be exchanged.

In an exemplary embodiment, a system for remitting promissory files, comprises: processing of computer instructions configured to receive, from a remote computing device using an Internet Protocol (IP) address, a batch of promissory files to be converted into a desired amount to be remitted in a desired currency to a forwarded or receiving cryptographic public key, received by a remote device at an Internet Protocol (IP) address; and returning of promissory files back to the original sender in a residual or remainder amount net of the face-value of promissory files to be remitted.

In an exemplary embodiment, a system for screening the illicit transfer of promissory files, comprises: processing of computer instructions configured to maintain an encrypted and private record of cryptographic public keys associated with personal identifiable information (PII); monitoring of promissory file transactions from cryptographic public keys; and reporting suspicious activities from cryptographic public keys to monetary authorities.

In an exemplary embodiment, a system for maintaining custodianship of promissory files, comprises: processing of computer instructions configured to maintain encrypted storage of promissory files owned by a cryptographic public key; receiving promissory files from a remote device for the encryption and persistent storage of the promissory files; and decrypting and sending promissory files to the owner of the promissory file denoted by the cryptographic public key in the latest signature block using an Internet Protocol (IP) address to a remote device.

The invention claimed is:

1. A method for constructing a cryptographically signable and verifiable binary promissory file representing fiat currency issued by a monetary authority, comprising:
   receiving, at a computing device, information describing:
   a universally unique identifier that is randomly generated;
   a promissory note issuance date timestamp that is generated by an operating system;
   an integer amount;
   an integer decimal precision;
   a currency code;
   a cryptographic public key matching a cryptographic signing key;
   a cryptographic signature of hashed root issuance parameters by a monetary authority cryptographic signing key; and a cryptographic public key of the monetary authority;
creating, using the computing device, the promissory file, wherein the promissory file comprises information describing:
the universally unique identifier;
the currency code;
the integer amount;
the integer decimal precision;
the cryptographic public key of the monetary authority;
an integer representing the promissory file issuance date timestamp;
a cryptographic signature of a latest signature block hash from the monetary authority;
a cryptographic signature of a latest signature block hash from a previous promissory file owner;
an unsigned integer of a signature block depth;
a recursive linked-list hash-chain signature block data structure containing a cryptographic public key of a promissory holder at the signature block depth; and
a hash of:
(i) a hash digest of a previous hash plus the cryptographic public key at the signature block depth; or
(ii) a genesis hash digest of the cryptographic public key of the monetary authority plus the universally unique identifier of the promissory file plus the promissory file issuance date timestamp plus the integer decimal precision of the promissory file plus the currency code of the promissory file, a previous linked signature block data structure, and a timestamp of when a signature block was created; and
creating, using the computing device, an initial hash for constructing a first signature block signed by the cryptographic signing key, based on:
the cryptographic public key of the monetary authority;
the universally unique identifier;
the promissory file issuance date timestamp;
the integer amount;
the integer decimal precision; and
the currency code; and
storing, using the computing device, the promissory file in a file system.

2. The method of claim 1, further comprising:
reading, using the computing device, the promissory file; and
returning values stored in the promissory file.

3. The method of claim 1, further comprising:
calculating, using the computing device, a next signature block hash by creating a new hash digest of a current signature block hash plus a cryptographic public key of the intended recipient to transfer ownership of the promissory file to the intended recipient; and
returning a next signature block hash.

4. The method of claim 1, further comprising:
searching, using the computing device, a file system directory for instances of promissory files; and
returning a list of read file buffers.

5. The method of claim 1, further comprising:
saving, in the file system, a file name for a promissory file instance based on:
a character string representation of the currency code;
the integer amount;
the integer decimal precision; and
a universally unique identifier.

6. The method of claim 1, further comprising:
issuing, using the computing device, promissory file.

7. The method of claim 1, further comprising:
ordering, using the computing device, comparison promissory files, wherein the ordering is based on decimal normalized amounts of the comparison promissory files.

8. The method of claim 1, further comprising:
normalizing, using the computing device, a promissory file instance amount against promissory files having different decimal place precisions.

9. The method of claim 1, further comprising:
calculating, using the computing device, a genesis hash of the promissory file; and
returning the genesis hash of the promissory file.

10. The method of claim 1, further comprising:
retrieving, from the file system, a latest signature block of the promissory file.

11. The method of claim 1, further comprising:
retrieving, from the file system, a previous signature block of the promissory file.

12. The method of claim 1, further comprising:
retrieving, from the file system, a cryptographic public key of a latest signature block, wherein the latest signature block denotes an owner of the promissory file.

13. The method of claim 1, further comprising:
recursing, using the computing device, a signature block linked list from a starting signature block; and
returning ancestor blocks within a recursed list.

14. The method of claim 1, further comprising:
restricting, using the computing device, a next signature block depth of the promissory file to not exceed a threshold signature block depth.

15. The method of claim 1, further comprising:
receiving a cryptographic public key of a recipient;
assigning, using the computing device, ownership of the promissory file using a cryptographic public key of a recipient to calculate a next signature block hash and cryptographically sign the hash with a cryptographic signing key of a current promissory file owner;
supplying, using the computing device, a cryptographic signature and a cryptographic public address of the recipient for use in a cryptographic verification and construction of a next signature block hash;
updating, using the computing device, a state of the promissory file; and
returning latest promissory data with an incremented signature block depth.

16. The method of claim 15, further comprising:
supplying, using the computing device, a cryptographic signature of a calculated next signature block hash from the monetary authority for use in cryptographic verification and construction of a next signature block hash.

17. The method of claim 1, further comprising:
verifying, using the computing device, a cryptographic correctness of the promissory file solely from contents of the promissory file;
computing, using the computing device, a root hash;
recursing, using the computing device, a signature block linked-list hash chain;
verifying, using the computing device, authorized and secured cryptographic signatures for a latest signature block match a re-computed linked-list hash-chain from a signature block history; and
locally verifying correctness of the promissory file without reliance on network connectivity.

18. The method of claim 1, further comprising:
receiving, using the computing device and from the monetary authority, an asynchronous cryptographic signature of the promissory file that is:
- a signature for a current signature block hash or;
- a signature for pre-authorizing a next computed signature block hash based on a cryptographic public key of a recipient; and updating, using the computing device, an authorized signature of the promissory file.

19. The method of claim 1, further comprising:
organizing, using the computing device, a plurality of promissory files for a given cryptographic public key in a binary heap to sort from highest to lowest respective decimal normalized promissory file amounts; and
calculating, using the computing device, a nearest balance of an account to a parameterized currency amount from a sorted collection.

* * * * *